United States Patent
Kizaki et al.

(10) Patent No.: US 7,595,903 B2
(45) Date of Patent: Sep. 29, 2009

(54) COLLABORATION SYSTEM, METHOD AND SOFTWARE PROGRAM FOR IMAGE FORMING APPARATUSES

(75) Inventors: Osamu Kizaki, Asaka (JP); Takahiko Uno, Tokyo (JP); Yoshimine Horiuchi, Kanagawa-ken (JP); Shuuichi Kimura, Tokyo (JP); Shingo Ohta, Chiba (JP); Takashi Soyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1015 days.

(21) Appl. No.: 10/763,011

(22) Filed: Jan. 22, 2004

(65) Prior Publication Data

US 2005/0088709 A1   Apr. 28, 2005

(30) Foreign Application Priority Data

| Jan. 23, 2003 | (JP) | 2003-015331 |
| Jan. 24, 2003 | (JP) | 2003-016599 |
| Jan. 24, 2003 | (JP) | 2003-016635 |
| Jan. 28, 2003 | (JP) | 2003-019531 |
| Jan. 31, 2003 | (JP) | 2003-025069 |
| Jan. 31, 2003 | (JP) | 2003-025114 |
| Mar. 14, 2003 | (JP) | 2003-070393 |

(51) Int. Cl.
*G06F 15/00* (2006.01)
*G03G 15/00* (2006.01)

(52) U.S. Cl. .................... 358/1.15; 399/12
(58) Field of Classification Search ............ 358/1.15, 358/1.16, 401, 442, 444, 434, 407, 296, 448; 399/8, 12, 13, 25, 35, 111; 370/338, 466, 370/401; 379/100.09, 102.02; 455/566; 340/5.52
See application file for complete search history.

(56) References Cited

U.S. PATENT DOCUMENTS 6,625,561 B1 *  9/2003  Tullis ................... 702/128

(Continued)

FOREIGN PATENT DOCUMENTS

JP       9-027876 A       1/1997

(Continued)

OTHER PUBLICATIONS

JP Office Action dated May 28, 2007 [English Abstract].

(Continued)

*Primary Examiner*—Saeid Ebrahimi Dehkordy
(74) *Attorney, Agent, or Firm*—Knoble Yoshida & Dunleavy LLC

(57) ABSTRACT

The collaboration among the image forming devices is practiced on the computer network for efficiently utilizing the printing resources. When a large print job is requested, the parent image forming device seeks an appropriate child image forming device to share the same print job during a predetermined collaboration process. To minimize the waste and maximize the productivity during the collaboration process, the parent device ascertains that the child device is able to complete a part of the collaboration print job before the corresponding image data is transferred from the parent device to the child device. One of the resources that the parent device ascertains is the available memory amount at the child device for the image data to be transferred. If a sufficient amount of memory is not available at the child device, the image data is transferred to prevent an incomplete collaboration task at the child device. In addition, other resources such as paper and toner are also monitored in conjunction with the memory. Furthermore, the parent and child device monitor each other for completing a collaboration print job so that the collaboration print job is completed in the most efficient manner.

44 Claims, 31 Drawing Sheets

U.S. PATENT DOCUMENTS

| | | | |
|---|---|---|---|
| 2001/0038462 A1* | 11/2001 | Teeuwen et al. | 358/1.15 |
| 2002/0109860 A1* | 8/2002 | Niitsuma | 358/1.15 |
| 2002/0141765 A1* | 10/2002 | Phillips | 399/27 |
| 2006/0015756 A1* | 1/2006 | Chrisop et al. | 713/193 |

FOREIGN PATENT DOCUMENTS

| | | |
|---|---|---|
| JP | 10-112769 A | 4/1998 |
| JP | 2000-335057 A | 12/2000 |
| JP | 2000-353071 A | 12/2000 |
| JP | 2001-100956 A | 4/2001 |
| JP | 2001-268284 A | 9/2001 |
| JP | 2001-296982 A | 10/2001 |
| JP | 2002-199152 A | 7/2002 |
| JP | 2002-254762 A | 9/2002 |

OTHER PUBLICATIONS

JP Office Action mailed May 29, 2007 [English Abstract].
JP Office Action dated Jul. 12, 2007. [English Abstract].
JP Office Action dated Aug. 30, 2007, mailed on Sep. 4, 2007 [English Summary].

* cited by examiner

FIG. 12

| | RESERVED JOB LIST | | | | | | STOP |
|---|---|---|---|---|---|---|---|
| | | | | | | | DETAIL |
| STATUS | NO. | USER | TEXT | PAGES | SET | TIME | NO JOBS WAITING : 1 |
| PRINTING | ■101 | SATOH | | 25 | 100 | 20 | ▲ PREVIOUS |
| | PLEASE CONFIRM CHILD DEVICE | | | | | | |
| 1 | ○201 | USER1 | TOTAL | 12 | 30 | 22 | ▼ NEXT |
| | | | | COLLABORATION JOB (PARENT) | | | CANCEL |

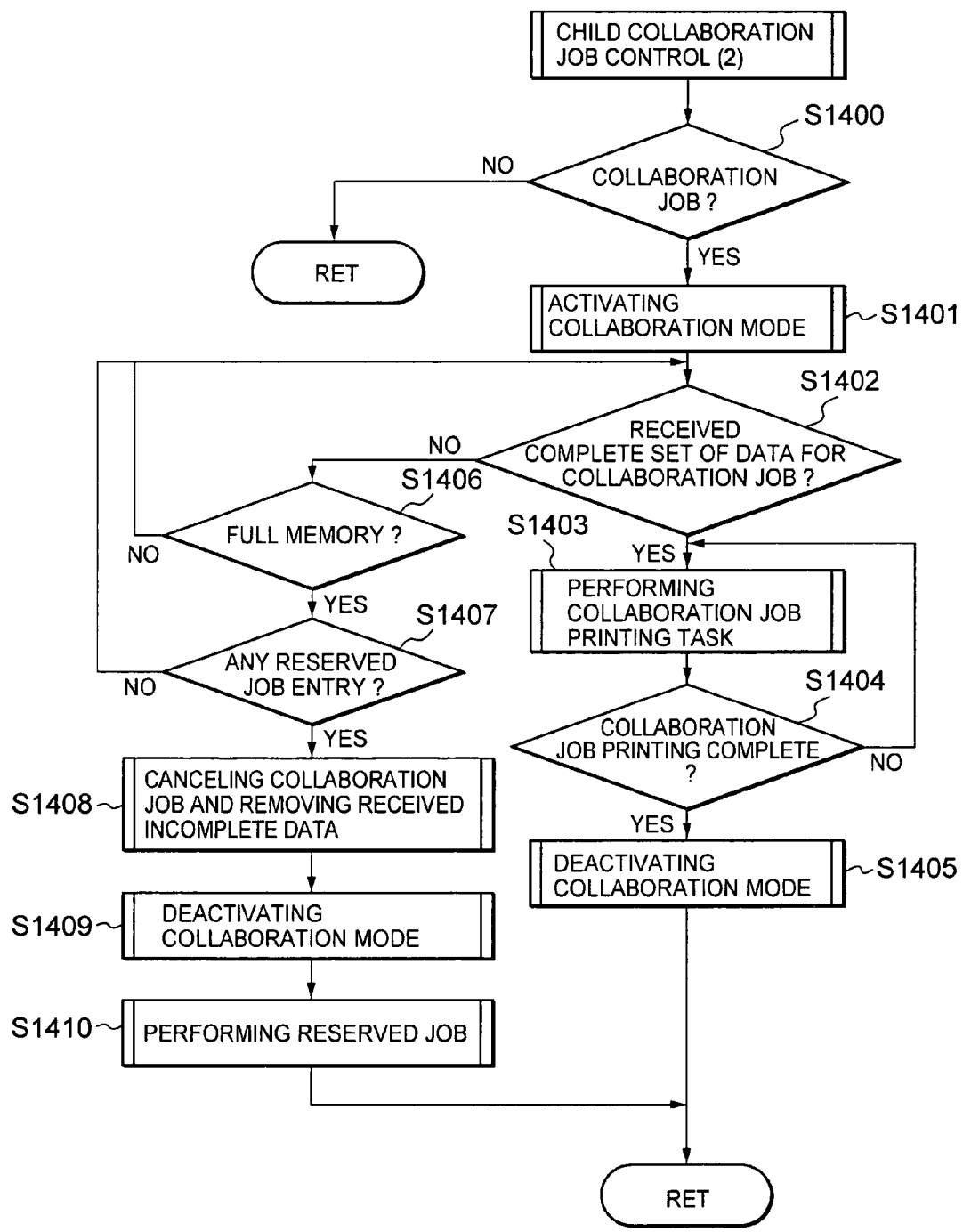

FIG. 23

CHILD DEVICE COLLABORATION LIST

ORIGINAL SIZE : 500   COLLABORATIONS : 2

| STATUS | DEVICE | REMAINING MEMORY | PAPER TRAY | PRINTING SPEED /MINUTE | INSTALLATION LOCATION |
|---|---|---|---|---|---|
| NOT IN USE | B | 600 | 2 | 25 | NEXT TO ENTRANCE |
| NOT IN USE | D | 1000 | 3 | 60 | NEXT TO MANAGER'S OFFICE |

STOP
DETAIL
▲ PREVIOUS
▼ NEXT
CANCEL

FIG. 25

PARENT DEVICE COLLABORATION LIST  [STOP]

ORIGINAL SIZE : 500  [DETAIL]

| STATUS | DEVICE | REMAINING MEMORY | REMAINING PAPER | REMAINING TONER | PRINTING SPEED /MINUTE | INSTALLATION LOCATION |
|---|---|---|---|---|---|---|
|  | B | 600 | A3 200 A4 500<br>B4 100 B5 300 | 60% | 25 | NEXT TO ENTRANCE |
| NOT IN USE | D | 300 | A3 100 A4 800<br>B4 600 B5 500 | 90% | 60 | NEXT TO MANAGER'S OFFICE |

COLLABORATIONS : 2

[▲ PREVIOUS]

JOB3 IS SENT TO DEVICE B.

[▼ NEXT]

[CANCEL]

FIG. 26

CHILD DEVICE COLLABORATION LIST  [STOP]

[DETAIL]

| STATUS | DEVICE | REMAINING MEMORY | REMAINING PAPER | REMAINING TONER | PRINTING SPEED /MINUTE | INSTALLATION LOCATION |
|---|---|---|---|---|---|---|
| NOT IN USE | A | 100 | A3 0 A4 100<br>B4 200 B5 100 | 80% | 100 | NEXT TO ENTRANCE |
| NOT IN USE | D | 300 | A3 100 A4 300<br>B4 300 B5 500 | 90% | 80 | NEXT TO MANAGER'S OFFICE |

COLLABORATIONS : 2

JOB NO3 FROM DEVICE A
ONE JOB RECEIVED

[▲ PREVIOUS]

| PARENT DEVICE | PRINTING MODE | ORIGINAL | COPY | COLOR MODE |
|---|---|---|---|---|
| A | TWO SIDE→TWO SIDE SORT | 10 | 16 | BLACK/ WHITE |

[▼ NEXT]

[CANCEL]

FIG. 31
ORIGINAL IMAGE
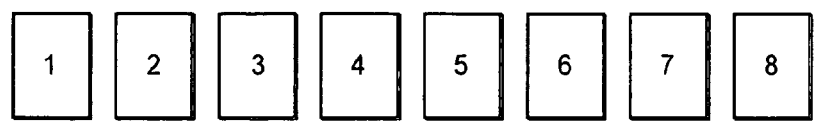
MEMORY
CONSOLIDATED
IMAGE
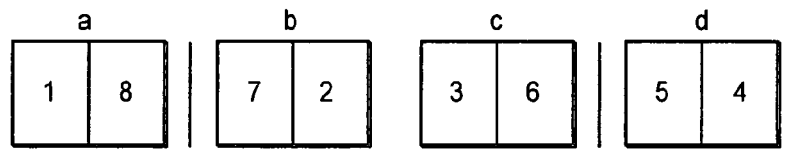
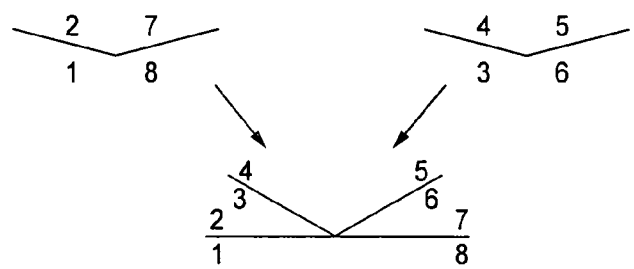

COLLABORATION SYSTEM, METHOD AND SOFTWARE PROGRAM FOR IMAGE FORMING APPARATUSES

FIELD OF INVENTION

The current invention is generally related to an image forming device network system and more particularly related to the improved productivity and operation of the image forming device network system.

BACKGROUND OF INVENTION

Prior art image forming devices include copiers, facsimile machines and printers. A plurality of these image forming devices is connected via network. In the network system with the above connected image forming devices, collaboration may be performed among the image forming devices. For example, the collaboration reduces the operation time by dividing the tasks. For example, when a single original is to be copied one hundred times, the originating image forming device that is given the above task communicates with other image forming devices. As a result of the communication, the task is divided between two image forming devices so that each device copies fifty times.

In addition, prior art image forming devices scan the originals on the contact glass and store the image information in memory. Based upon the stored image information, an image is printed on the image transfer paper, and the repeated print operations provide a predetermined number of copies. In the above prior art image forming devices, a remaining memory amount is monitored while the originals are being scanned. The scanning operation is interrupted before the remaining memory reaches zero. The copy operation is determined by the user upon detecting the zero memory. The user can select either terminating the copy operation or starting the copy of the image information that has been already scanned. For example, if an automatic feeding mode is used to feed an original to the contact glass surface from the original tray of the automatic document feeder (ADF) and the remaining memory has reached zero, since some of the originals have been already outputted, the user has to put back the originals in the feeding tray after the user cancels the copy operation and retries the same copy operation.

For the prior art technology, the following reference Japanese Patent Publication 2000-69259 discloses that the image information is scanned by an arbitrary image forming device among a plurality of image forming devices, and the image information is transferred to another one of the image forming devices to distribute printing for improved operation in the network system.

In the prior art image forming devices, outputted transfer paper is wasted at a child device when a copy job is terminated in response to a memory full detection at the child device. Further, a single original bundle is unfortunately divided for output at a child device when a specified number of copies is outputted based upon the transferred image at the child image. It remains desirable to provide a highly efficient image forming device network system that causes no wasteful miscopy even when memory becomes full at a child device.

In the prior art image forming devices, a job is reserved on another machine or a child device before a print job is divided for the transferred image data. The next job reservation is made while the current print job is in operation, is being transferred, or is being printed as a divided job. As Japanese Patent Publication Hei 10-322533 discloses that copiers print out images in the storage unit even if a collaboration unit fails to make printers collaborate during the print operation in the image forming device network. The above printing under abnormal conditions continues as much as possible to prevent decreased productivity by terminating the print operation at other copiers.

The Print Operation

For the above prior art system, it is necessary to keep the image data in the storage unit so that the print job is continued until the print job is completed at any one of the printers in the system. However, since a child device may have another job in addition to the current collaboration job, to use the memory resources in an efficient manner, it is also necessary to remove image data that no longer requires the print division. For this reason, it remains desirable to provide an image forming device to efficiently utilize the memory resources in sharing a print job among image forming devices that are connected in common network.

Other prior art references such as Japanese Patent Publications Hei 10-74163 and 2001-13827 disclose the memory resource utilization techniques. To effectively utilize the common memory resources, a memory controller arbitrates the use of the common memory resource among a plurality of software application programs in multifunction devices as well as copiers, printers and fax machines as disclosed in Hei 10-74163. To guarantee a memory area for a collaboration job, a memory block is reserved. However, when there is no collaboration, the memory block is available for any other tasks by a single operation as disclosed in 2001-13827. Furthermore, the rest of the memory block is released if not used even during collaboration. However, the prior art techniques cause restrictions on the memory resources by other application program operations at a child device if the image data is transferred at the beginning of collaboration. For example, if the image data is transferred for collaboration during the execution of a previous job at a child device, the previous job may restrict the memory for a subsequent job. In a worst case, the previous and subsequent jobs compete for memory, and a deadlock may occur. Furthermore, when a next non-collaboration job is to be registered at a child device, the memory resource similarly may not be available. For the above reasons, it remains desirable to control the timing of transferring image data in order to increase the efficiency in the memory resource utilization at a child device.

There are other issues that are associated with image data transfers. As described above, Japanese Patent Publication 2000-69259 discloses a prior art technology that the image information is scanned by an arbitrary image forming device among a plurality of image forming devices, and the image information is transferred to another one of the image forming devices to distribute printing for improved operation in the network system. The image data is scanned by an arbitrary master or parent device among the image forming devices. Alternatively, the image data is already scanned and stored in an external memory storage unit. However, when the image data is distributed among child devices, the remaining memory amount may differ among the child devices. The parent memory may reach zero while the original is being scanned as the remaining memory is monitored. As a result, the original is returned, and it is inefficient. For this reason, it remains desirable to increase the productivity in scanning to distribute the image data among the image forming devices for sharing printing. In prior art technologies, remaining memory is monitored while original documents are scanned. Before the remaining memory reaches zero, scanning is interrupted. Then, a user is given a choice to select. He or she can terminate the copying operation. Alternatively, he or she can specify that the printing is initiated for the image data that has been already scanned. In prior art technologies, remaining supplies such as paper and toner are monitored. At the beginning of a job or during the job, a message is generated upon detecting any empty supply for an operator to provide exhausted supplies. The job is continued after supplies are provided. In the image forming device network system, a job is generated by a parent device and shared among child devices in collaboration as disclosed by Japanese Patent Publication 2001-238035. It remains desirable to monitor the supply level at each of the child devices during the assignment of the print job during collaboration.

In prior art technologies, a final image including from a parent device and a child device is printed at a child device in order to make the print output to be equal to that from a single image forming device. To provide the final image, it is desired that a new consolidated image is generated at a parent image in stead of transferring the scanned image data to the child image. For this reason, it is not necessary to store the image data at a child device, and the child device memory resource is efficiently utilized. Furthermore, it is desired to transfer the image data to a child device from the last page in the reverse order in case of the stack mode printing at a child device.

SUMMARY OF THE INVENTION

In order to solve the above and other problems, according to a first aspect of the current invention, an image forming device network system, a parent device including a first image scanning unit for scanning an image to generate image data, a first memory unit connected to the first image scanning unit for storing the image data that has been scanned in by the image scanning unit, a first image forming unit connected to the first memory unit for reading the image data and forming an image on an image-transferring medium and a first control unit connected to the first image scanning unit, the first memory unit and the first image forming unit for controlling the first image scanning unit, the first memory unit and the image forming unit, the first control unit controlling transfer of the image data via the network, at least one child device connected to the parent device through a network including a second memory unit operationally connected to the first memory unit for storing the image data that has been transferred from the first memory unit via the network, a second image forming unit connected to the second memory unit for reading the transferred image data and forming an image on an image-transferring medium, a second control unit connected to the second memory unit and the second image forming unit for controlling the second memory unit and the second image forming unit, the image forming device network system including, a first remaining memory detection unit connected to the first memory unit for detecting a remaining amount of memory in the first memory unit, a collaboration unit connected to the parent device and the child device for activating a collaboration mode for a collaboration print job between the child device and the parent device, a receiving unit located at the child device and connected to the parent device for receiving the image data that is transferred from the parent device to the child device, and an execution unit connected to the receiving unit for initiating the second image forming unit for the collaboration print job only after an entire portion of a predetermined size of the transferred image data for the collaboration print job is stored in the second memory unit.

According to a second aspect of the current invention, an image forming device network system, including: a parent device further including: a first image scanning unit for scanning an image to generate image data, a first memory unit connected to the first image scanning unit for storing the image data that has been scanned in by the image scanning unit, a first remaining memory detection unit connected to the first memory unit for detecting a remaining amount of memory in the first memory unit, a first image forming unit connected to the first memory unit for reading the image data and forming an image on an image-transferring medium, and a first control unit connected to the first image scanning unit, the first memory unit and the first image forming unit for controlling the first image scanning unit, the first memory unit and the image forming unit, the first control unit controlling transfer of the image data via the network, and at least one child device connected to the parent device through a network further including: a second memory unit operationally connected to the first memory unit for storing the image data that has been transferred from the first memory unit via the network, a second image forming unit connected to the second memory unit for reading the transferred image data and forming an image on an image-transferring medium, and a second control unit connected to the second memory unit and the second image forming unit for controlling the second memory unit and the second image forming unit, wherein the first control unit and the second control unit performing a collaboration print job, the first control unit and the second control unit initiating a collaboration mode for the collaboration print job only after an entire portion of a predetermined size of the transferred image data for the collaboration print job is stored in the second memory unit.

BRIEF DESCRIPTION OF THE DRAWINGS

FIG. 12 is a diagram illustrating a display example of the reserved job list for collaboration according to the current invention.

FIG. 14 is a flow chart illustrating steps involved in a second preferred process of collaborating at the child device according to the current invention.

FIG. 23 is a display example illustrating the remaining memory size in the child device for collaboration according to the current invention.

FIG. 25 is a diagram illustrating and exemplary parent display at the parent device in a preferred embodiment according to the current invention.

FIG. 26 is a diagram illustrating an exemplary child display at the child device in a preferred embodiment according to the current invention.

FIG. 31 is a diagram illustrating an exemplary operation of consolidated memory data for a bind mode according to the current invention.

DETAILED DESCRIPTION OF PREFERRED EMBODIMENTS

Figure 1:
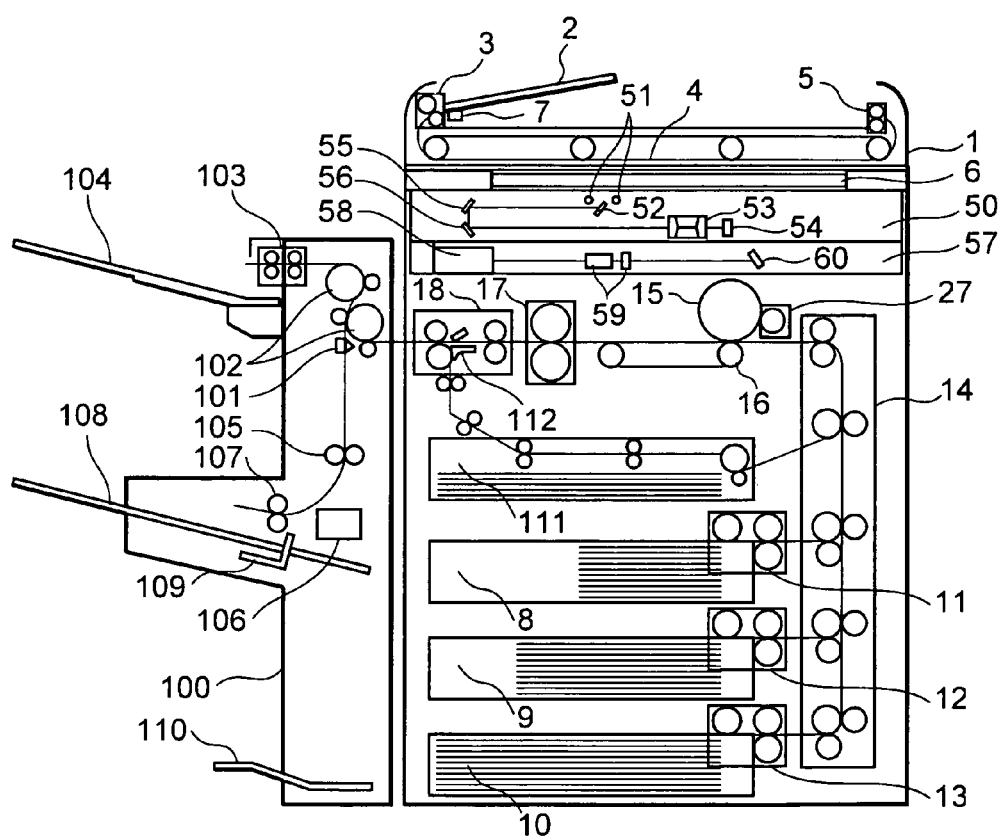
FIG. 1 is a diagram illustrating an image forming device as used as a parent device and a child device according to the current invention.

Now referring to FIG. 1, a diagram illustrates an image forming device as used as a parent device and a child device according to the current invention. The image forming device includes an automatic document feeder (ADF) 1, a feeding tray 2, a transfer roller 3, a transfer belt 4, an output roller 5, a contact glass 6, a original detector 7, a first tray 8, a second tray 9, a third tray 10, a first paper supply unit 11, a second paper supply unit 12, a third paper supply unit 13, a vertical transfer unit 14, a photoreceptor drum 15, a fixation unit 17, a paper output unit 18, a scanning unit 50, an exposure lamp 51, a first mirror 52, a lens 53, a CCD image sensor 54, a second mirror 55, a third mirror 56, a writing unit 57, a laser output unit 58, an image forming lens 59, a mirror 60, a finisher 100, switching plate 101, a stacker transfer roller 102, a stacker output roller 103, a stacker tray 104, a stapler transfer roller 105, a stapler 106, a stapler output roller 107, a stapler try 108, a drop stopper 109, a drop try 110, a two-side paper supply unit 111 and a divider 112.

The operation of the image forming apparatus will be described. An original document bundle is placed face-up on the tray 2 of the ADF 1. After the start key 34 is pressed, the original document from the top is sequentially sent to a predetermined position on the contact glass 6 through the transfer roller 3 and the transfer belt 4. After the scanning of the image data is completed from the document on the glass 6 by the scanning unit 50, the scanned original document is outputted by the transfer belt 4 and transfer roller 5. When a next original document is detected by the original detection unit 7 on the original tray 2, the detected original is similarly transferred to the contact glass 6. The transfer roller 3, the transfer belt 4 and the output roller 5 are driven by a motor. The image-transfer paper on the first, second and third trays 8, 9, and 10 have been respectively supplied by the first, second and third paper supply units 11, 12 and 13 and are transferred to a contact position of the photoreceptor drum 15 by the vertical transfer unit 14. The image data that is scanned by the scanning unit 50 is written on the photoreceptor drum 15 via laser from the writing unit 57. A toner image is formed on the photoreceptor drum 15 by passing through the developing unit 27. The image-transfer paper is transferred at the same speed as the rotational speed of the photoreceptor 15 by the transfer belt 16, and the toner image is transferred from the photoreceptor to the image transfer paper.

Subsequently, the transferred image is fixed on the image transfer sheet by the fixing unit 17 before outputting by the output unit 18 the processed paper to the finisher 100. The finisher 100 is a post process device which outputs the paper to the regular output tray 104 via the transfer roller 103 by switching the switching plate 101 towards the upward direction. The switching plate 101 leads the transfer paper towards the direction of the regular output roller 102 or the staple processing unit. By switching the switching plate 101 downwards, the image transfer paper is transferred to the staple board 108 via the transfer rollers 105 and 107. The image transfer paper on the staple tray 108 is sorted by the edges by drop stopper 109 and is stapled by a stapler 106 upon completing each set. The stapled copy is stored in the staple complete tray 110. On the other hand, the regular output tray 104 is movable in the forward and backward directions, and it moves back and forth for each sorted copy according to the image memory in order to sort an output copy.

When two sides are copied, the image-transfer paper supplied from the paper supply trays 8 through 10 is not lead to the output tray 104 and is temporarily stacked in the two-side paper supply unit 111 by setting the divider 112 to the up position. The image transfer paper in the two-sided paper supply unit 111 is supplied again from the two-sided paper unit 111 in order to transfer a toner image on the photoreceptor drum 15 then, the image transfer paper is lead to the output tray 104 by setting the divider 112 in the lower position. As described above, the two-sided paper supply unit 111 is utilized in order to form images on the both sides of the transfer paper.

The operation will be further described for an image scanning unit and an image forming unit. The scanning unit 50 includes a contact glass 6 for placing the originals and optical scanning components. The optical scanning components further includes the exposing lamp 51, the first mirror 52, the lens 53 and the CCD image sensor 54. Although not shown in the drawing, the exposing lamp 51 and the first mirror 52 are fixed on the first carriage. Similarly, the second mirror 55 and the third mirror 56 are fixed to a second carriage. In scanning, the above components are fixed on the first and second carriages so that the optical path length does not change. The original image is scanned by the CCD sensor 54 and is converted into electrical signals. The lens 53 and the CCD sensor 54 are moved in the right and left directions to change the image size. Thus, in response to a specified image size, the lens 53 and the CCD sensor 54 are positioned in the right and left directions.

The writing unit 57 includes the laser output unit 58, the image focusing lens 59, and the mirror 60. In the laser output unit 58, a laser diode as a laser source and a polygon mirror to be rotated at a high speed by a motor are housed. The laser from the laser output unit 58 is reflected by the polygon mirror and passes through the focusing lens 59. After the laser is reflected back by the mirror 60, it is focused upon the photoreceptor drum 15. The laser light is scanned in the major scanning direction that is perpendicular to the rotational direction of the photoreceptor drum 15 to record a line unit of image signals that are outputted from a selector 64 in the image processing unit. By repeating the scanning according to predetermined period that corresponds to the photoreceptor drum rotational speed and the recording density, a static image is formed on the photoreceptor drum surface. The laser light from the writing unit 57 is reflected on the photoreceptor drum 15 of the image forming system. A beam sensor is located near one end of the photoreceptor drum 15 at a laser beam target position in order to trigger a scanning synchronization signal. Based upon the scanning synchronization signal, a control signal is generated to input/output the image signal and to control the image record start timing in the scanning direction.

Figure 2:
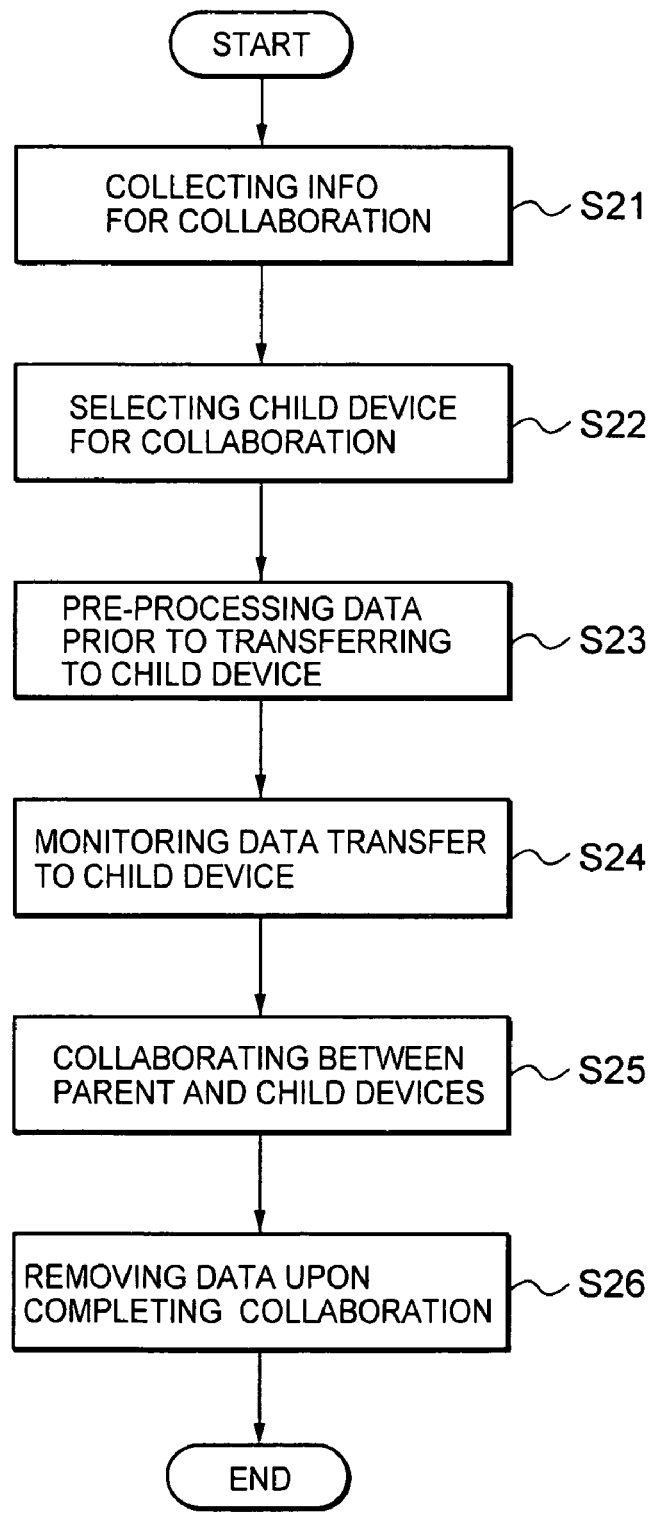
FIG. 2 is a flow chart illustrating general steps involved in a preferred process of performing collaboration between the parent and childe devices according tot the current invention.

Now referring to FIG. 2, a flow chart illustrates steps involved in a preferred process of performing collaboration between the parent and child devices according tot the current invention. The following steps are general steps for collaboration, and the detail operations will be later described. In a step S21, information is collected for collaboration. In a step S22, a device is selected for collaboration to follow. After a child device has been selected for collaboration with the parent device, image data is preprocessed prior to transferring the data to the selected child device in a step S23. During the subsequent transfer of the preprocessed data in a step S24, the data transfer is being monitored. Upon completion of the data transfer to the selected child device, the collaboration is performed for a selected job on the transferred data between the parent device and the selected child device in a step S25. After the child device and or the parent device completes the collaboration process, the data corresponds to the complete collaboration process is removed from memory in a step S26. The above described steps generally provides the sequence of relevant events involved in the collaboration process according to the current invention.

Figure 3:
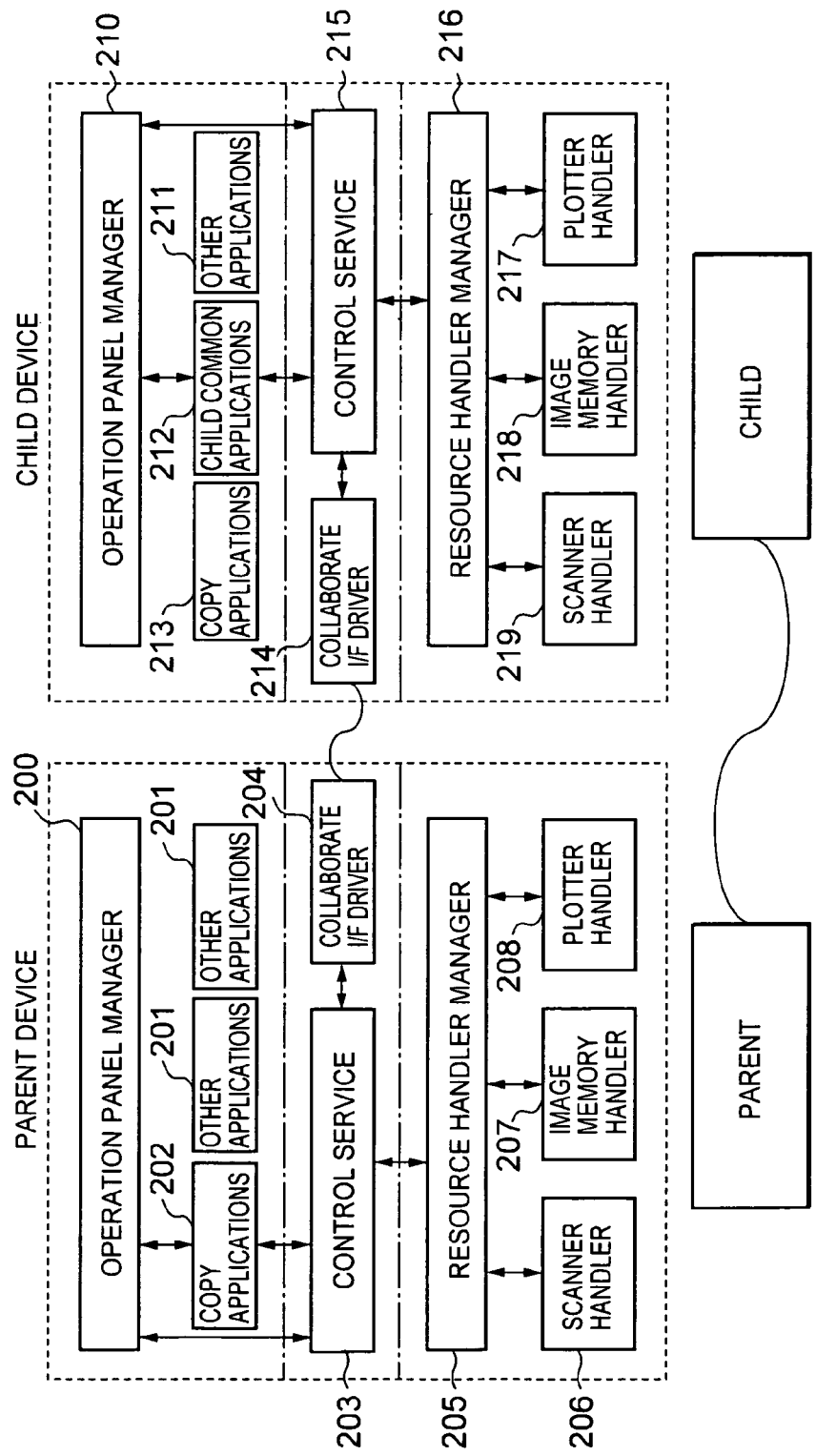
FIG. 3 is a block diagram illustrating software modules in the image forming device to be used as a parent and child devices for collaboration according to the current invention.

Now referring to FIG. 3, a block diagram illustrates software modules in the image forming device to be used as a parent and child devices for collaboration according to the current invention. In general, the job information that is set in the application layer is sent to the control service layer upon a trigger such as a start key. The control service layer interprets the job information from the application layer and requests the handler manage for the process information to operate the handler layer. The handler manager operates each one of the handlers according to the process information. The handlers include a scan handler 206 and 219 for controlling the scanning unit, an image memory handler 207 and 218 for controlling input/output (I/O) of image data to and from the image memory as well as a plotter handler 208 and 217 for controlling post process peripherals, paper transfer and writing unit. The handlers perform processes of scanning, storing in the image memory and forming an image according to the software modules in association. The image forming device includes a collaboration I/F driver 204 and 214 for connecting other image forming devices for collaboration. The collaboration I/F driver 204 and 214 enables the reception and transmission of the command information and image data via the interface. For a collaboration copy job that started at a parent device after the job information is interpreted in the parent control service 203, the collaboration copy job is executed by dividing it into a process for storing the scanned image into the image memory and a process for transferring the image to the child image memory. Upon completing the necessary image transfer, the child control service 215 generates a print process for referring to the already transferred image data according to the information received from the parent control service 203. The child control service 215 then requests the child handler manager 216 to print. The child control service 215 reports to the parent device each time when the child device finishes the print job. The parent control service 203 monitors its parent print job and child print jobs according to the above reported information. Thus, the parent control service 203 performs necessary printing.

"Reservation Copy" will be described. It is a function to make an in-progress print job at a certain status to read a next job and make it in to a wait status if it is possible to reserve. The print wait job automatically resumes its printing when a printing turn is available after the print in-progress job finishes. The reservation job is automatically activated for printing when its turn is available after the current print job is finished.

Figure 4:
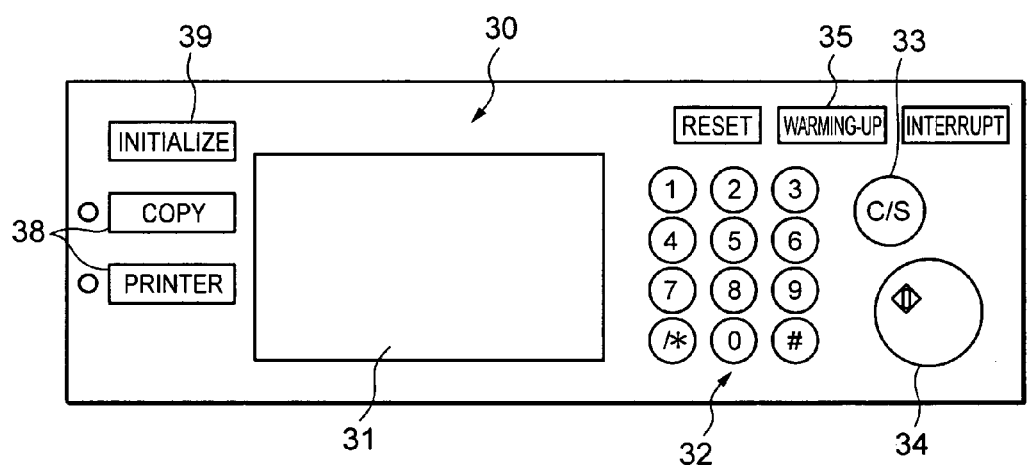
FIG. 4 is a diagram illustrating an operation unit of the child or parent device in one preferred embodiment according to the current invention.

Now referring to FIG. 4, a diagram illustrates an operation unit of the child or parent device in one preferred embodiment according to the current invention. An operation unit 30 includes a liquid crystal touch panel 31, a key pad 32, a clear/stop key 33, a print key 34, a warm up key 35 and a reset key 36. Furthermore, the operation unit 30 also includes an initialization key 39 and a copy or printer key 38. These keys are self-explanatory as most of them are almost standard for image forming devices.

Figure 5:
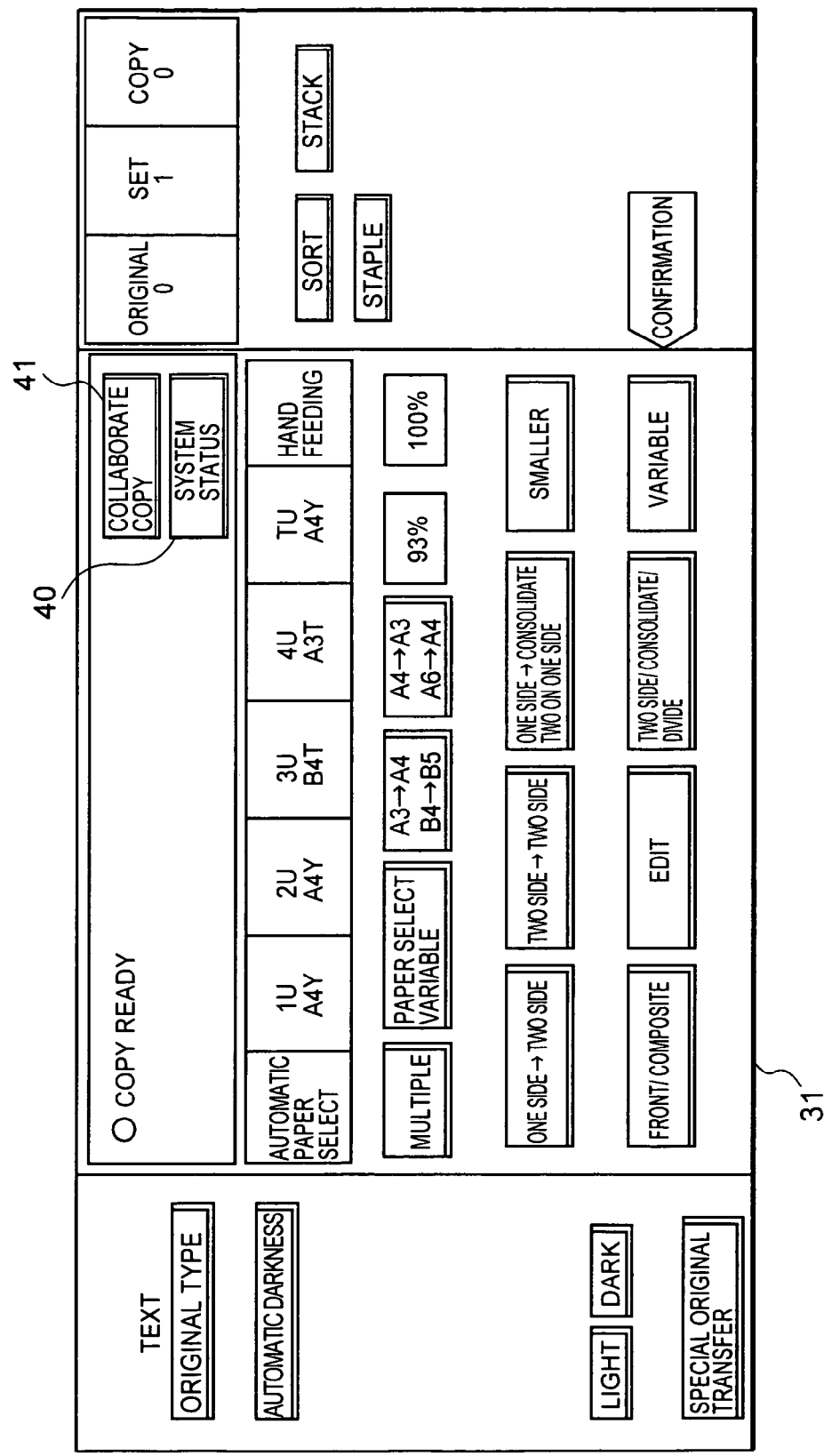
FIG. 5 is a block diagram illustrating details of the liquid crystal touch panel 31 of FIG. 4 according to one preferred embodiment according to the current invention.

Referring to FIG. 5, a block diagram illustrates detail of the liquid crystal touch panel 31 of FIG. 4 according to one preferred embodiment according to the current invention. In general, when an operator touches a specific area of the display or the liquid crystal touch panel 31, the selected function reverses itself to black. When the details of a particular function need to be specified, a corresponding detail setting screen is displayed upon touching a specific key. For example, variable values are displayed for a variable operation. Since the liquid crystal touch panel 31 uses a dot display device, an appropriate display is graphically provided. In the block diagram, a message area is shown in the upper central portion where messages are. The messages include "copy is available" and "please wait." The right area includes a number of copies display, an automatic paper selection key, a sort key for specifying a step of handling a copy at a time in order, a stack key for specifying a page distribution, a staple key for specifying a step of stapling one set, a percentage key for specifying a percentage, a variable key for setting enlargement/reduction, a two-side key for setting two sides, an edit key for specifying certain conditions such as binding mode, a front/composite key for setting a front/composite mode, a system status key 40 for providing the system information and a collaboration mode key 41 for specifying print out a large number of print outs via a plurality of devices via the digital copier network. Furthermore, a supply tray status is displayed for a supply tray number, and a key is displayed for manually selecting a paper supply tray.

Figure 6:
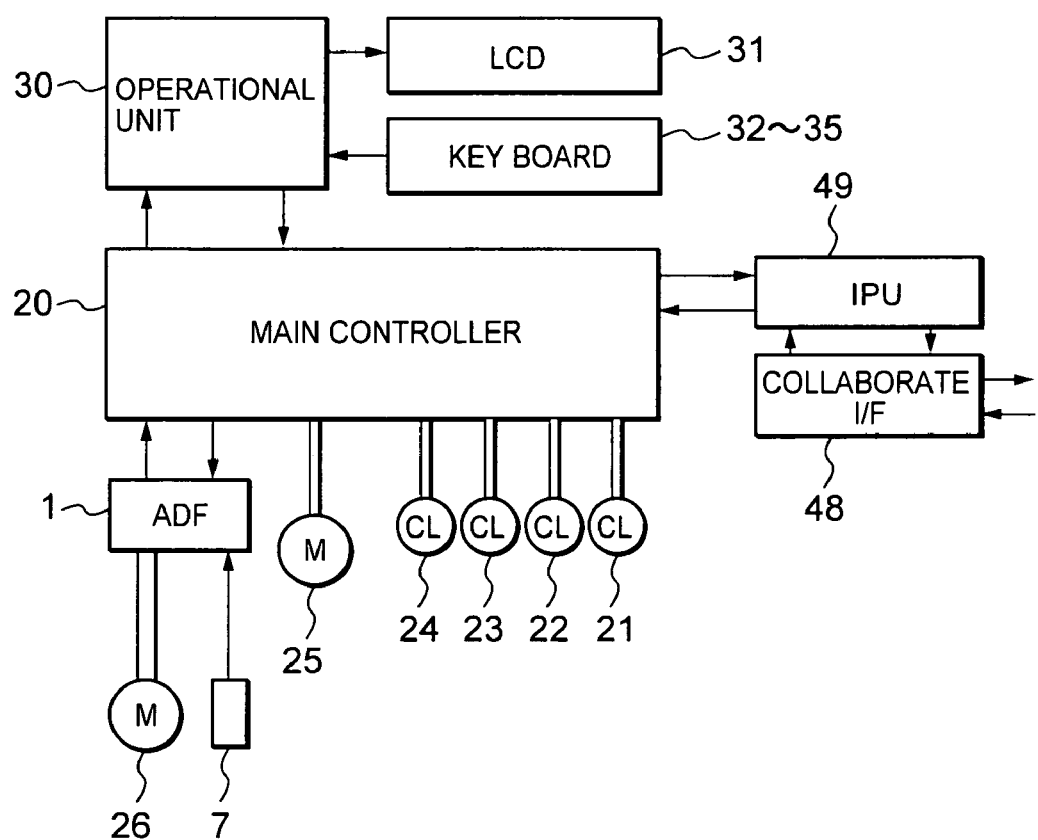
FIG. 6 is a block diagram illustrating some relationships between the motors and other control elements as already described in the previous drawings of the current invention.

Now referring to FIG. 6, a block diagram illustrates some relationships between the motors and other control elements as already described in the previous drawings of the current invention. The control system of the image forming apparatus includes a main controller 20 for centrally controlling the whole image forming device or digital copier. The main controller 20 is connected to an image processing unit (IPU) 49, a collaboration interface (I/F) 48, ADF 1 and an operation unit 30. Furthermore, the main controller 20 is directly connected to a main motor 25, intermediate clutch 21 for the vertical transport unit, a first paper supply clutch 22, a second paper supply clutch 23, and a third paper supply clutch 24. The ADF 1 is connected to a transferring motor 26 and an original detecting unit 7 while the operation unit 30 is connected to a liquid crystal display (LCD) 31 and various input keys 32 through 35. That is, the main controller 20 is connected to the operation unit 30 for displaying information to the operator and for receiving the function setting information from the operator. The main controller 20 is also connected to the IPU 49 for image processing to generate an image from the stored image data, for writing image originals to the image memory storage and for controlling a scanner.

Figure 7:
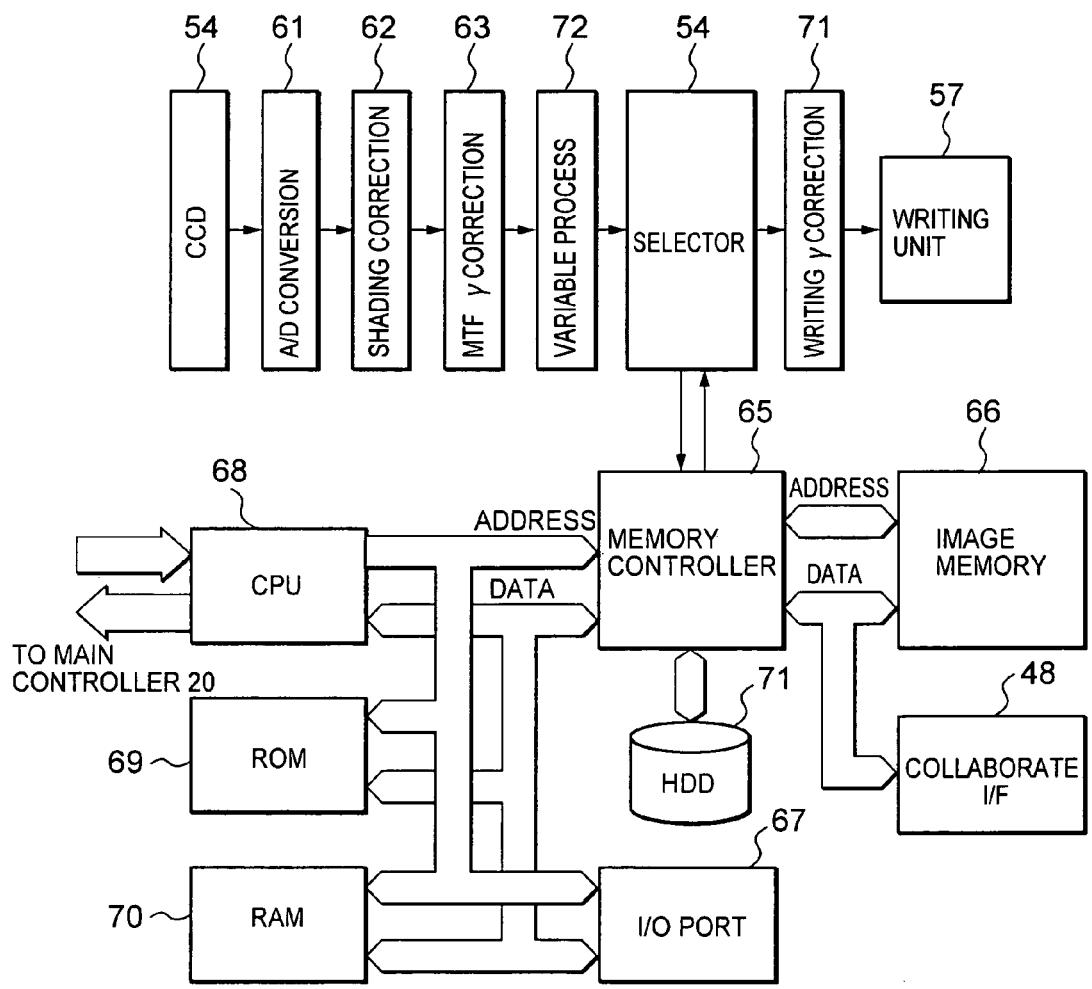
FIG. 7 is a block diagram illustrating the image forming unit (IPU) according to the current invention.

Now referring to FIG. 7, a block diagram illustrates the image forming unit (IPU) according to the current invention. The light from the exposing lamp 51 targets the original surface, and the reflected light is used to form an image at the CCD sensor 54 via a focusing lens. The light received at the CCD 54 is converted into digital signals via an A/D convertor 61. After the digital image signal is corrected for shading at a shading correction unit 62, an image processing unit 63 performs MTF correction and γ correction. A selector 54 switches the destination of the image signals between an image memory controller 65 and a writing γ correction unit 71. The image signals via the writing γ correction unit 71 is transmitted to a writing unit 57. The image signal is inputted and outputted in both directions between the image memory controller 65 and the selector 54. The IPU possesses data input output selection functions to process externally provided image data in addition to the image data from the scanning unit 50. For example, additional data includes the output from data processing devices such as a personal computer. The IPU further includes a CPU 68 for controlling the writing unit 57 and the scanning unit 50 as well as setting the image memory controller 65. The memory controller 65 also controls a collaboration I/F 48 and an input/output port 67. The IPU also includes a RAM 70 and a ROM 69 for storing programs and data. The CPU 68 writes data to and read data from an image memory 66 via the memory controller 65. Lastly, the content of the image memory 66 is stored via a hard disk drive HDD 71.

Figure 8:
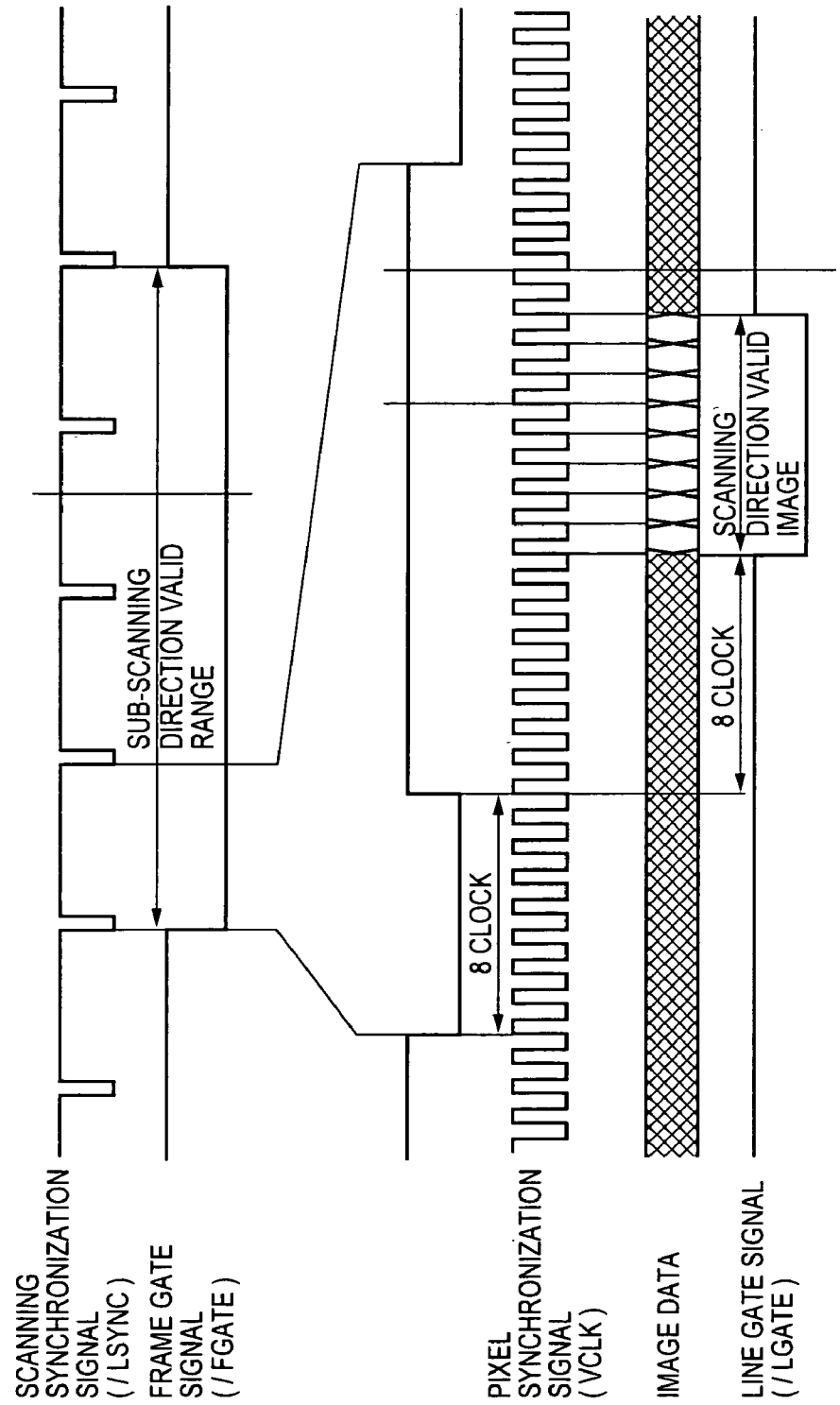
FIG. 8 is a timing chart illustrating image signals for one page of image at the selector.

Referring to FIG. 8, a chart illustrates image signals for one page of image at the selector 54. A frame gate signal (/FGATE) indicates a valid period for one page of image data in the subscanning direction. The scanning direction synchronization signal (/LYSNC) is a synchronization signal for each line. The image signal becomes valid by a predetermined clock after the synchronization signal. A line gate signal (/LGATE) indicates that the image signal in the scanning direction is valid. The above signals are synchronized with image clock (VCLK). For one cycle of VCLK, one pixel data is transferred. The IPU 49 generates a separate set /FGATE, /SYNC, /LGATE and VCLK for input and output image data to enable various combination of image inputs and outputs. To perform task distribution, it is necessary to transmit and receive commands and image data with other digital copiers. In the preferred embodiment, IEEE 1394 collaboration interface is used for the transmission and reception of image data while the serial communication line is used for the transmission and reception of commands. The memory controller 65 implements the collaboration interface via the collaboration interface 48 driver.

Figure 9:
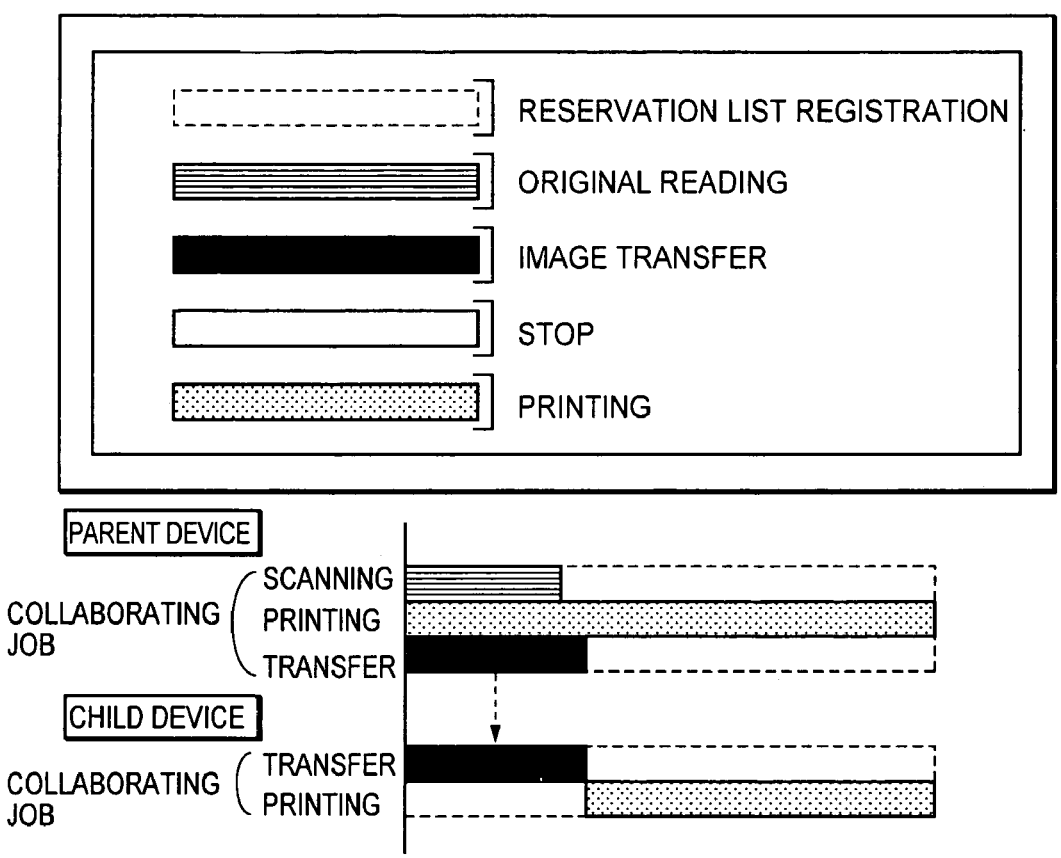
FIG. 9 is a timing diagram illustrating a basic exemplary operation of collaboration according to the current invention.

Referring to FIG. 9, a timing diagram illustrates a basic exemplary operation of collaboration according to the current invention. The example shows one-to-one collaboration that image is transferred from a parent device to a child device and that the image is printed after the completion of the image data transfer. The horizontal axis shows time. At a parent device, a copy operation is initiated. As an image is scanned or read, a print operation is started. At a child device side, the scanned image is transferred from the parent device. The print operation at the child device is initiated after the image transfer is completed. The print operation is controlled to prevent waste of printed paper at the child device in case of an interrupted job due to a memory full situation.

Figure 10:
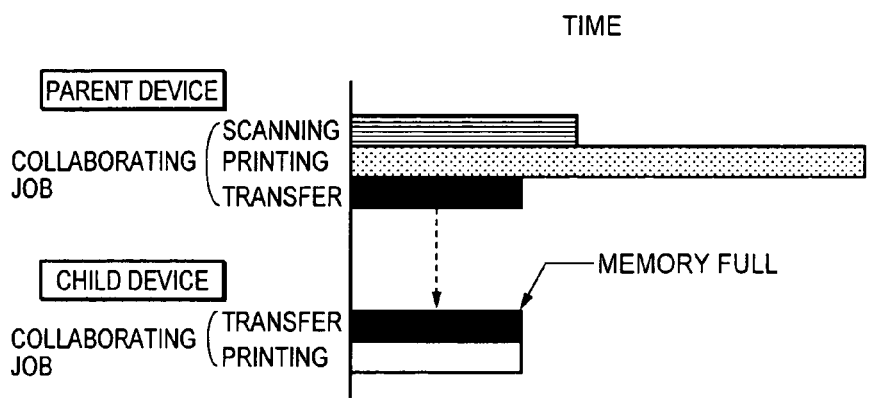
FIG. 10 is a timing diagram illustrating another example of the collaboration task according to the current invention.

Referring to FIG. 10, a timing diagram illustrates another example of the collaboration task according to the current invention. Again, the horizontal axis is time. In a one-to-one collaboration, a full memory situation occurs at a child device. At the parent device, both scanning and printing are executed upon start of a copy. At the child device, the scanned image is transferred from the parent device. During the image transfer, since the child memory becomes full and there is no more memory, a memory full situation occurs. As a result, the image transfer is interrupted and no printing takes place. As a result, no printout is wasted for the interrupted collaboration job.

Figure 11:
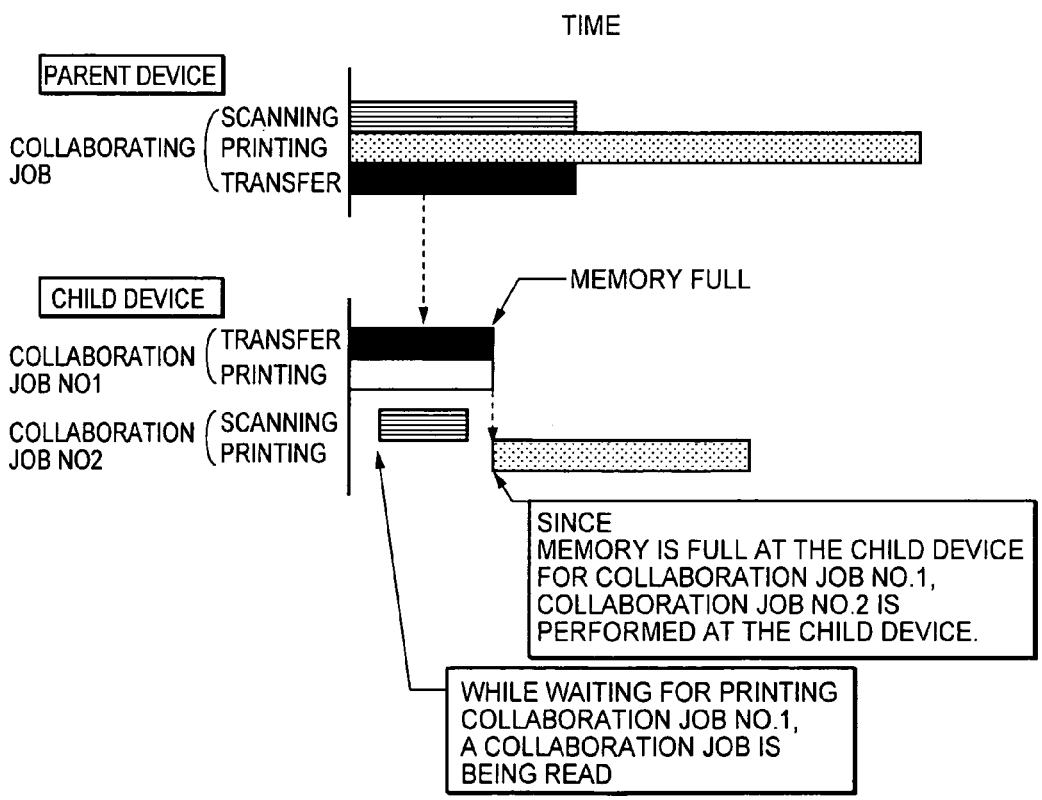
FIG. 11 is a timing diagram further illustrating yet another example of collaboration according to the current invention.

Now referring to FIG. 11, a timing diagram further illustrates yet another example of collaboration according to the current invention. At the parent device, both scanning and printing take place after a copy job is initiated. At the same time, scanned image data is transferred from the parent device to the child device for collaboration. During the image data transfer, the child memory becomes full. As a result, the collaboration job is now canceled. At the child device, since the current collaboration job has been cancelled, the previously reserved print collaboration job is now executed at the child device. Also at the child device, while the previously reserved print collaboration job is being executed, another scanning collaboration job is executed.

Referring to FIG. 12, a diagram illustrates a display example of the reserved job list for collaboration according to the current invention. The status indicates that the first job 101 is being printed and one hundred sets are to be printed. For the currently printed job, the original has 25 pages, and it takes 20 minutes to complete printing. For the next job 201, the status is 1 indicating the top of the list. The next job 201 has 12 pages and 30 sets. It takes 22 minutes. The detail of the jobs is displayed by pressing the detail button. The jobs can be also canceled by pressing the cancel button. If more jobs are on the list than displayed, the jobs are scrolled back and forth by the previous or next button.

Figure 13:
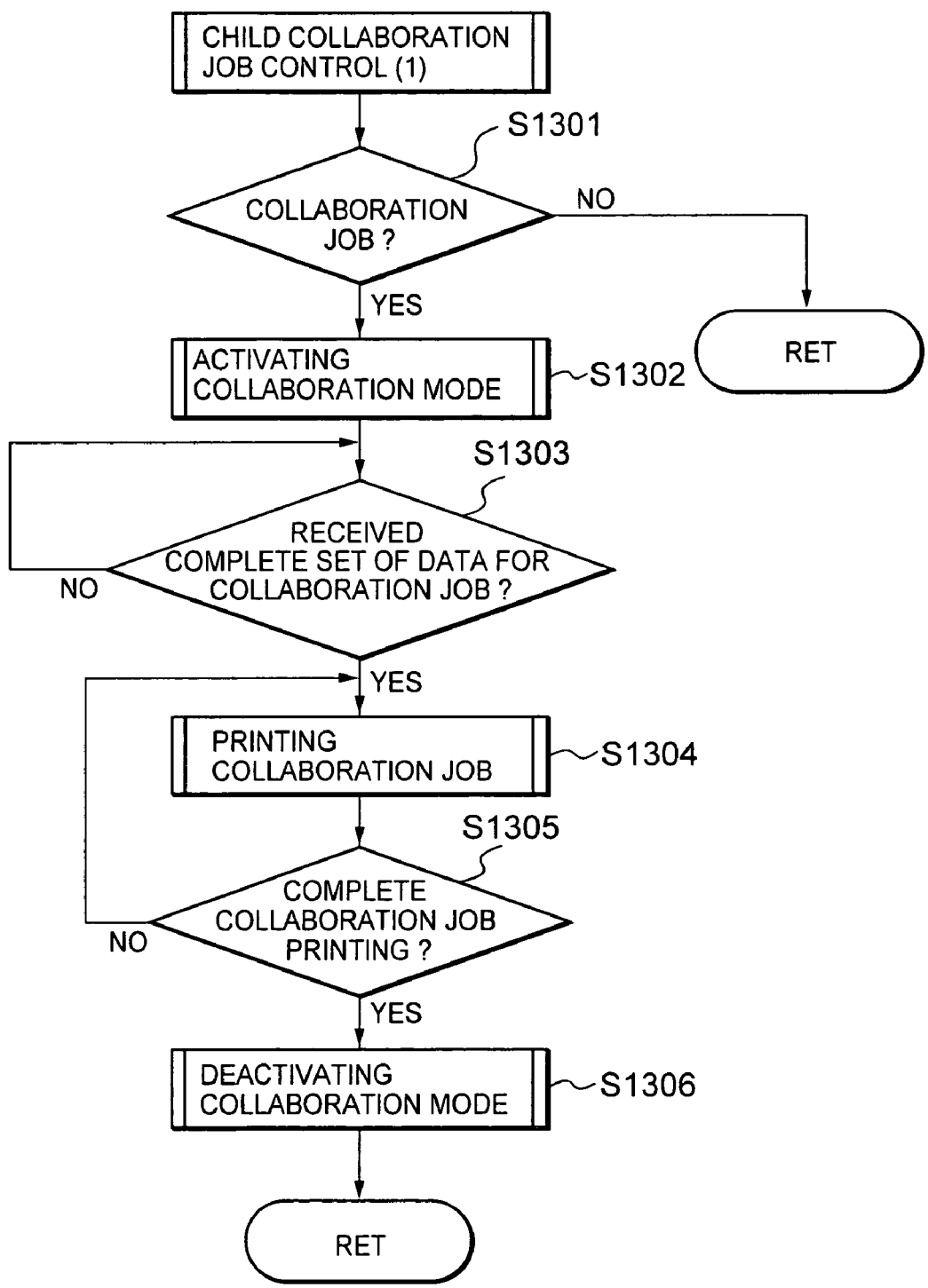
FIG. 13 is a flow chart illustrating steps involved in a preferred process of collaborating at the child device according to the current invention.

Now referring to FIG. 13, a flow chart illustrates steps involved in a preferred process of collaborating at the child device according to the current invention. In a step S1301, it is determined whether or not it is a collaboration job. If it is determined in the step S1301 that a task is not a collaboration print job, the preferred process is terminated and returns. On the other had, if it is determined in the step S1301 that a job is in collaboration, the preferred process proceeds to a step S1302, where a collaboration mode is set. Subsequently, the preferred process determines in a step S1303 whether or not a complete set of image data has been received for the collaboration job. If it is determined in the step S1303 that the last image page has not been received, the preferred process returns to the beginning of step S1303 to repeat the above determination to wait till the last page is received. On the other hand, if it is determined in the step S1303 that the complete set of the image data has been received, the preferred process proceeds to a step S1304, where the collaboration print job is executed. Then the preferred process determines whether or not the collaboration print job is completed in a step S1305. If it is determined in the steps that the collaboration job has not completed, the preferred process returns to the step S1304 to resume the collaboration print job for completion. On the other hand, the collaboration print job is indeed completed in the step S1305, the preferred process proceeds to a step S1306, where the collaboration mode is deactivated to a non-collaboration mode to complete the preferred process of controlling the collaboration print job at the child device.

Now referring to FIG. 14, a flow chart illustrates steps involved in a second preferred process of collaborating at the child device according to the current invention. It is determined in a step S1400 whether or not a job is a collaboration job. If it is not a collaboration job, the preferred process terminates by returning. On the other hand, if it is determined that the job is indeed a collaboration job in the step S1400, the preferred process activates the collaboration job mode in a step S1401. It is determined in a step S1402 whether or not the last page of the image data has been received at the child device for the collaboration print job. If it is determined in the step S1402 that the last page or a complete set has not been received, it is further determined in a step S1406 whether or not memory at the child device is full. If it is determined in the steps S1402 and 1406 that the complete set is not yet received and that memory is not full, then the preferred process waits for pages until it receives the last image page in the step S1402. However, if it is determined in the steps S1402 and S1406 that the memory full conditions has occurred before the complete set of the image data has been received at the child device, the preferred process proceeds to a step S1407, where a reserved job list is examined. If it is determined in the step S1407 that there is no job, the preferred process returns to the step S1402 to again wait for receiving the complete set. In the step S1402, the transferred image data is stored at the child device for the collaboration job. If there is another printer operation or another process, memory may be available after these operations or processes are complete. Since memory may be available after a corresponding file is removed, the collaboration mode is maintained. Because of the above possibilities, the collaboration print job is performed, and the collaboration operation increases its productivity. On the other hand, if it is determined in the step S1407 that there is a job entry in the collaboration reserve list, the transferred image data is removed for the canceled collaboration print job in a step S1408. Subsequently, the collaboration job mode is deactivated in a step S1409. Then, the preferred process executes the reserved job in a step S1410.

Still referring to FIG. 14, the preferred process takes a different path if it is determined in the step S1402 that a complete set of the image data has been received in the step S1402. In a step S1403, the collaboration print job is executed. If it is determined in a step S1404 that the collaboration print job is completed, the collaboration mode is deactivated in a step S1405 and the preferred process terminates itself by returning. On the other hand, if it is determined in the step S1404 that the collaboration print job is not complete, the preferred process returns to the step S1403. As described above, the preferred process removes the received image data and deactivates the collaboration operation without waiting for the entire collaboration job to complete. The child device under the memory full condition is freed from the attempted collaboration job and becomes available for accepting or executing other jobs. In particular, if a reserved print job exists at a child device after the current collaboration ends, the machine utilization rate increases since the child device executes the reserved print job immediately following the memory full condition occurs. However, if no reserved job exists, the collaboration print job and the transferred image data are stored. Memory may be available if other print operations are currently being executed and terminate. Furthermore, the collaboration mode is maintained since memory may become available after a stored file is removed from a hard disk (HDD). Thus, the collaborated operation increases its productivity for the collaboration printing.

Figure 15A:
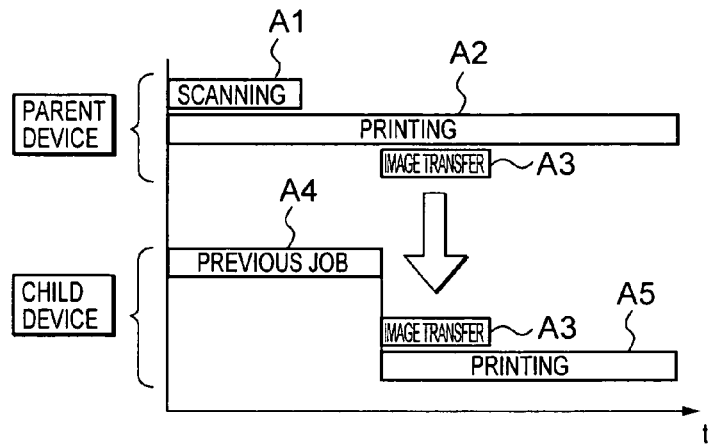
FIG. 15A is a timing chart illustrating a sequence of events involving the initiation of a collaborative operation during a job in-progress at a child device according to the current invention.

Now referring to FIG. 15A, a timing chart illustrates a sequence of events involving the initiation of a collaborative operation during a job in-progress at a child device according to the current invention. The chart illustrates events at the child device as well as the parent device in the vertical axis while time in the horizontal axis. At the parent device, a copy operation is initiated. The scanning is activated in a sequence A1, and the printing takes place in a sequence A2 partially at the same time. On the other hand, at the child device, a previous job is being executed in a sequence A4 while the copy operation takes place at the parent device. Because of the ongoing previous job execution, the copy job for the child device becomes a reserved job for collaboration. Upon completing the previous job at the child device, the image data for the collaboration job is transferred from the parent device to the child device during a sequence A3. As the image data at the child device becomes sufficiently available, the image data is printed at the child device in a sequence A5. In the above exemplary sequence of events, it has been assumed that the requested print job at the parent device is sufficiently large and that the print sequence A2 outlasts beyond the completion of the previous job at the child device. In other words, the print sequence A2 has not finished the required amount of printing so that the child device printing sequence A5 is necessary to complete the print job initiated at the parent device.

Figure 15B:
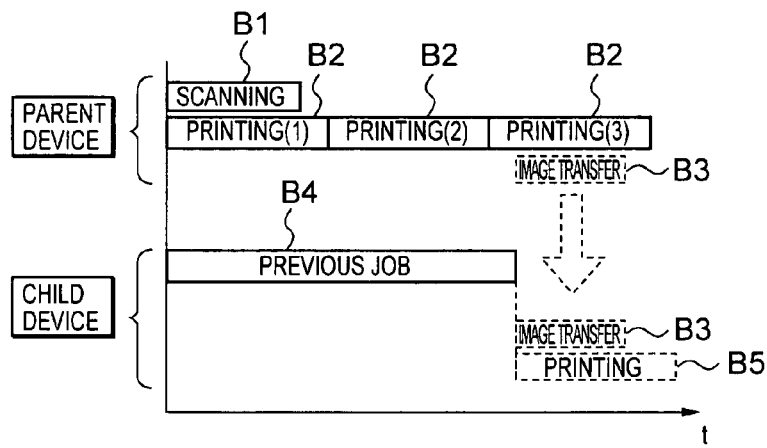
FIG. 15B is a timing chart illustrating another sequence of events involving the initiation of a collaboration job during a job in-progress at a child device according to the current invention.

Now referring to FIG. 15B, a timing chart illustrates another sequence of events involving the initiation of a collaboration job during a job in-progress at a child device according to the current invention. The chart illustrates events at the child device as well as the parent device in the vertical axis while time in the horizontal axis. At the parent device, a copy operation is initiated for three sets of copies. The scanning is activated in a sequence B1, and the printing has taken place in a sequence B2. The printing sequence B2 prints three sets of copies in this example as indicated by the parenthesized number. On the other hand, since the child device is executing an ongoing job in a sequence B4 at the time of the parent copy job initiation, the collaboration print job becomes a reserve job at the child device. Thus, the image data transfer becomes activated after the completion of the ongoing job at the child device. At the activation time for the image data transfer after the child device job completion, the parent device has started the third set of the copy. That is, the reserved print job has completed by the parent device, and the print job no longer requires any additional printing. For the above reason, as indicated by the dotted lines, the image data transfer is canceled in a sequence B3, and no printing takes place in a sequence B5. Consequently, the memory resource that has been committed to the child device is promptly released for other use.

Figure 15C:
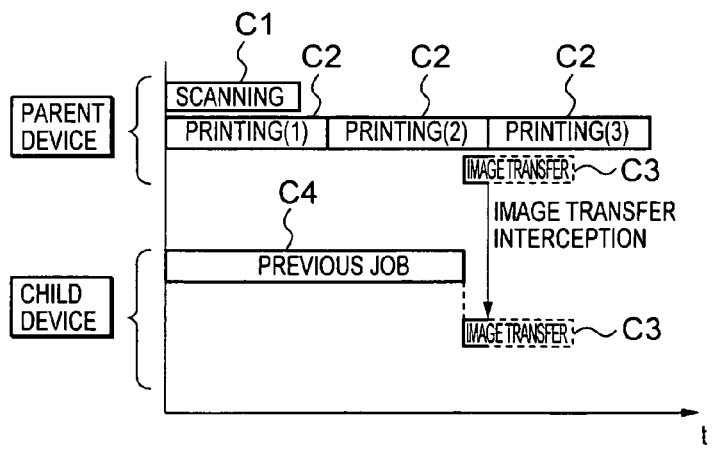
FIG. 15C is a timing chart illustrating yet another sequence of events involving the initiation of a collaboration job during a job in-progress at a child device according to the current invention.

Now referring to FIG. 15C, a timing chart illustrates yet another sequence of events involving the initiation of a collaboration job during a job in-progress at a child device according to the current invention. The chart illustrates events at the child device as well as the parent device in the vertical axis while time in the horizontal axis. As described above, at the parent device, a copy operation is initiated for three sets of copy. The scanning is activated in a sequence C1, and the printing has taken place in a sequence C2. The printing sequence C2 prints three sets of copies in this third example as indicated by the parenthesized number. On the other hand, since the child device is executing an ongoing job in a sequence C4 at the time of the parent copy job initiation, the collaboration print job becomes a reserve job at the child device. At the child job completion time, the image data transfer is initiated from the parent device to the child device for collaboration before the second set of copies is completed at the parent device. However, before the image data transfer completes in C3, the parent device finishes printing of the third set of copies in the sequence C2. Consequently, the image transfer C3 is interrupted since the original copy job is completed and the child collaborative print job is no longer needed. The memory resource that has been committed to the child device is promptly released.

As described above with respect to FIGS. 15A, 15B and 15C, the timing of image data transfer for collaboration depends upon the availability of the child device. If the child device is processing a process or previously reserved job, the currently requested job must wait for the completion of the ongoing process or job. Meanwhile, the parent job continues to execute the current job a part of which has been requested to a child device for collaboration. Depending upon timing of the completion of the original job at the parent device and the availability of the child device, the image data transfer may be interrupted as in the case of FIG. 15C or may not take place at all as in the case of FIG. 15B even though the collaboration job had been reserved at the child device. In other words, the collaboration job is constantly monitored, and either the parent device or the child device completes the original job as much as possible.

Figure 16:
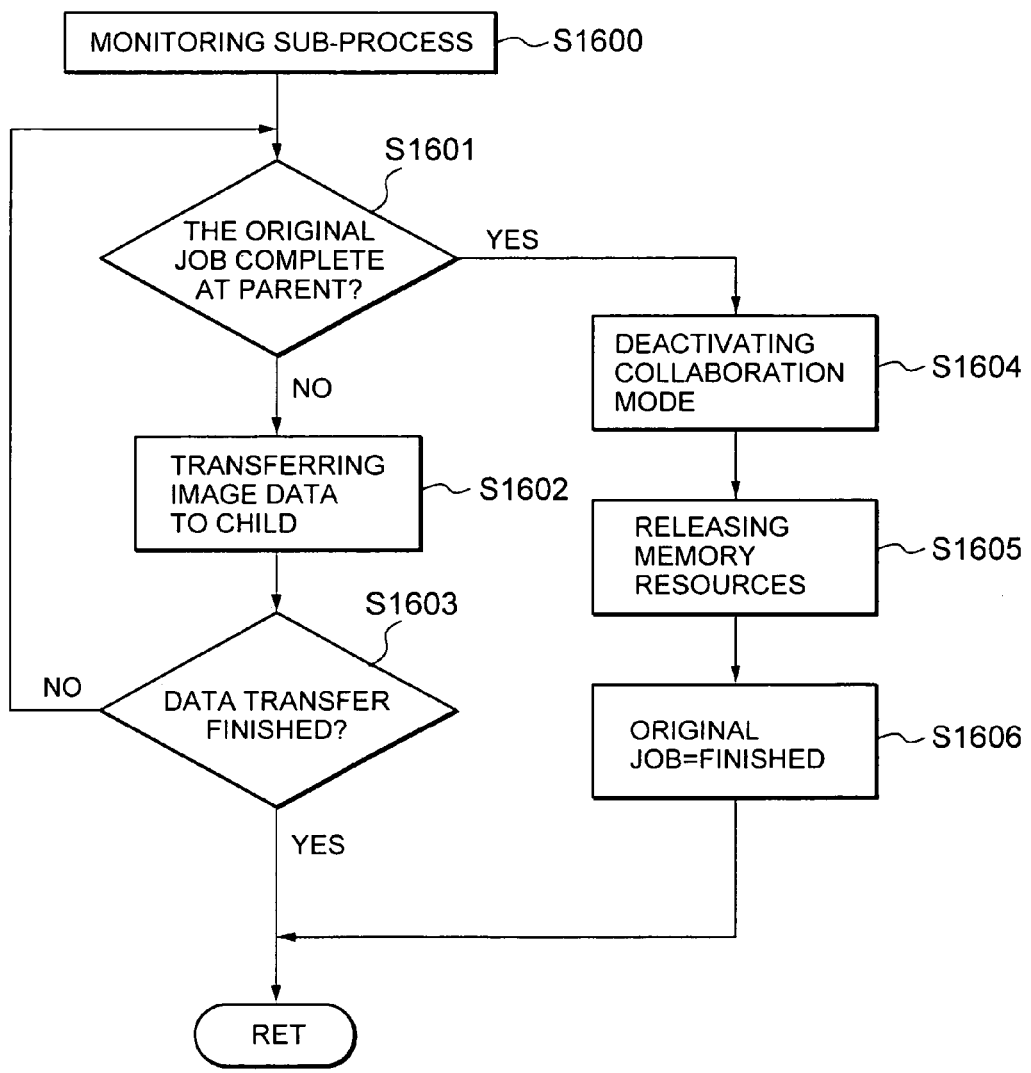
FIG. 16 is a flow chart illustrating steps involved in a preferred process monitoring image data transfer according to the current invention.

Now referring to FIG. 16, a flow chart illustrates steps involved in a preferred process of monitoring image data transfer according to the current invention. After the parent device has selected a child device for collaboration with respect to a particular original job as initiated at the parent device, the parent device continues to execute the original job regardless of the availability of the selected child device. In a step S1601, the preferred process at the parent device determines whether or not the original job has completed. If it is determined in the step S1601 that the job has not yet completed, the image data is transferred from the parent device to the selected child device in a step S1602 for the collaboration job at the child device. It is further determined in a step S1603 whether or not the image data transfer has completed for the collaboration job. If it is determined in the step S1603 that the image data transfer is not yet completed, the preferred process returns to the step S1601, where the original job is monitored. On the other hand, if it is determined in the step S1603 that the image data transfer is complete for collaboration, the preferred process terminates. During the monitoring process, if it is determined any time in the step S1601 that the original job is completed before the completion of the data transfer, the preferred process proceeds to a step S1604, where the collaboration mode is immediately deactivated. In other words, the collaboration job is now cancelled as there is no need for executing it at the child process. In a step S1605, any memory resources including the cancelled collaboration job and any corresponding transferred image data are released from the child device memory. The released memory resources are now available for any future or pending job. Lastly, in a step S1606, the preferred process indicates to other processes or steps that the particular original job has been completed. One way to indicate the completion is a flag in which a value reflects a status.

Figure 17:
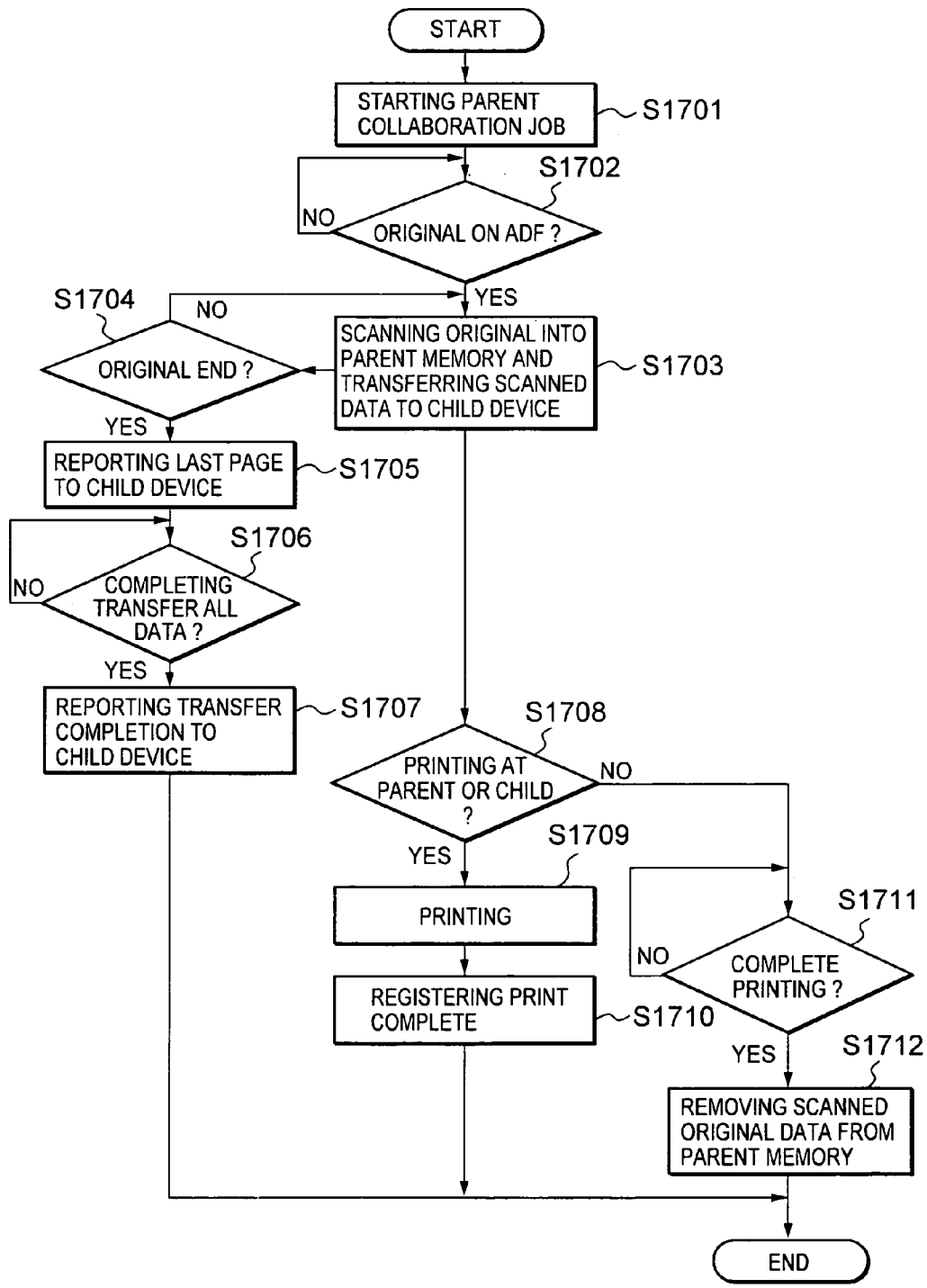
FIG. 17 is a flow chart illustrating steps involved in a first preferred process of printing image data at the parent device during collaboration according to the current invention.

Now referring to FIG. 17, a flow chart illustrates steps involved in a first preferred process of printing image data at the parent device during collaboration according to the current invention. The child device and the parent device are connected through the IEEE 1394 Interface. The parent device reads or scans the original documents, and the scanned image data is distributed to the child device through the above interface for collaboration. First, the parent collaboration process will be described: After the parent collaboration key 40 is pressed, the parent device determines whether or not an image forming device as a child device exists and is connected to the parent device through the above interface. If the above child device exists, the collaboration copy key 40 is now reversed for display to indicate that the parent device is now connected to a child device. In a step S1701, the print key 34 as shown in FIG. 4 indicates that it is ready to start a copy job by changing its display color to a predetermined color such as green. If a print key is pressed, the preferred process in the parent device determines in a step S1702 whether or not an original exists in the original tray 2 of the ADF 1 of FIG. 1. If the preferred process determines in the step S1702 that no original document exists, the preferred process waits for an original to be placed in the original tray 2 and displays a message such as "Document Size Not Detected" in the message area as shown in FIG. 5.

On the other hand, if the preferred process determines in the step S1702 that the original exists, the original is scanned by the scanning unit 50 after it is placed on the contact glass 6 via the transfer belt 4 and the transfer roller 3. The image data is transferred from the parent device to the selected child device via the collaboration interface in a step S1703. The image data includes the scanning direction dot number, an image transfer paper size code, a resolution level, an image direction, a printing surface and an image format as well as the scanned image data. The image data is used to print the image at the child device. The image scanning direction dot number is a number of dots in the scanning direction for a range of writing. The transfer paper size code is used to automatically select a paper tray. The image direction is an output rotational angle for printing. The printing surface data indicates one-side, both side front surfaces or both sides back surfaces. While the scanned image data is transferred from the parent device to the child device via the collaboration interface, it is also stored at the memory 66 at the parent device for later printing. For multiple sets of sort printing, an image is temporarily stored in the HDD73 in order to write the image in the image memory 66.

Still referring to FIG. 17, in the step S1703 and the subsequent steps at the parent device, the scan and sort print handling are performed in parallel. The preferred process at the parent device in a step S1704 determines whether or not the last page has been scanned. If it is determined that the last page has not been scanned in the step S1704, the preferred process returns to the step S1703 to resume scanning. On the other hand, if it is the last page in the step S1704, the parent device reports to the child device about the last page in a step S1705. Subsequently, the preferred process determines in a step S1706 whether or not all of the scanned images have been transferred to the child device. If not all of the images have been transferred as determined by the step S1706, the preferred process repeats the step S1706 to wait for the image data completion. When the preferred process determines in the step S1706 that the image transfer has completed, the parent device reports the child device about the completion in a step S1707. Lastly, the preferred process terminates itself.

On the other hand, in parallel with the above described scanning and transferring of the image data, the preferred process determines in a step S1708 whether or not the parent device itself performs the sort printing. Since the parent and child devices divide the priority by the set, the above set determination takes place at the beginning of the print task. If it is determined in the step S1708 that certain sets are printed at the parent device, the parent device executes printing in a step S1709. When the parent device completes the allocated amount of printing in the step S1709, the parent device stores the print completion result in the internal memory in a step S1710. In contrast, if it is determined in the step S1708 that the parent device does not have any share of printing, the preferred process further determines in a step S1711 whether or not the printing at both the parent and child devices has been completed. If it is determined in the step S1711 that the printing has not been completed either at the child device or the parent device, the preferred process waits in the step S1711 until completion. Upon completion, the preferred process proceeds to a step S1712, where the parent device removes the corresponding image data stored in the HDD73 on the image memory 66 for the completed print job. Lastly, the preferred process terminates itself. As described above, the memory for the stored image data becomes available only after the entire print job at the child and parent devices has been completed.

To summarize the above flow chart in FIG. 17, the above steps are grouped into three categories. A first category is related to transferring of the image data and includes the steps S1704 through S1707. A second category is related to printing of the image data and includes the steps S1708 through S1710. A third category is related to removing of the image data and includes the steps S1711 through S1712. For each set of copies, the above described flow including the steps 1701 through 1712 is initiated from the START to the END. The steps S1708 through S1710 are performed for each set of copies, and the steps S1710 and S1711 are performed after the printing is complete. Since there is no more set of copies to be printed in the NO branch of the step S1708, it means that the last set of copies was made. The S1711 is thus performed after printing.

Figure 18:
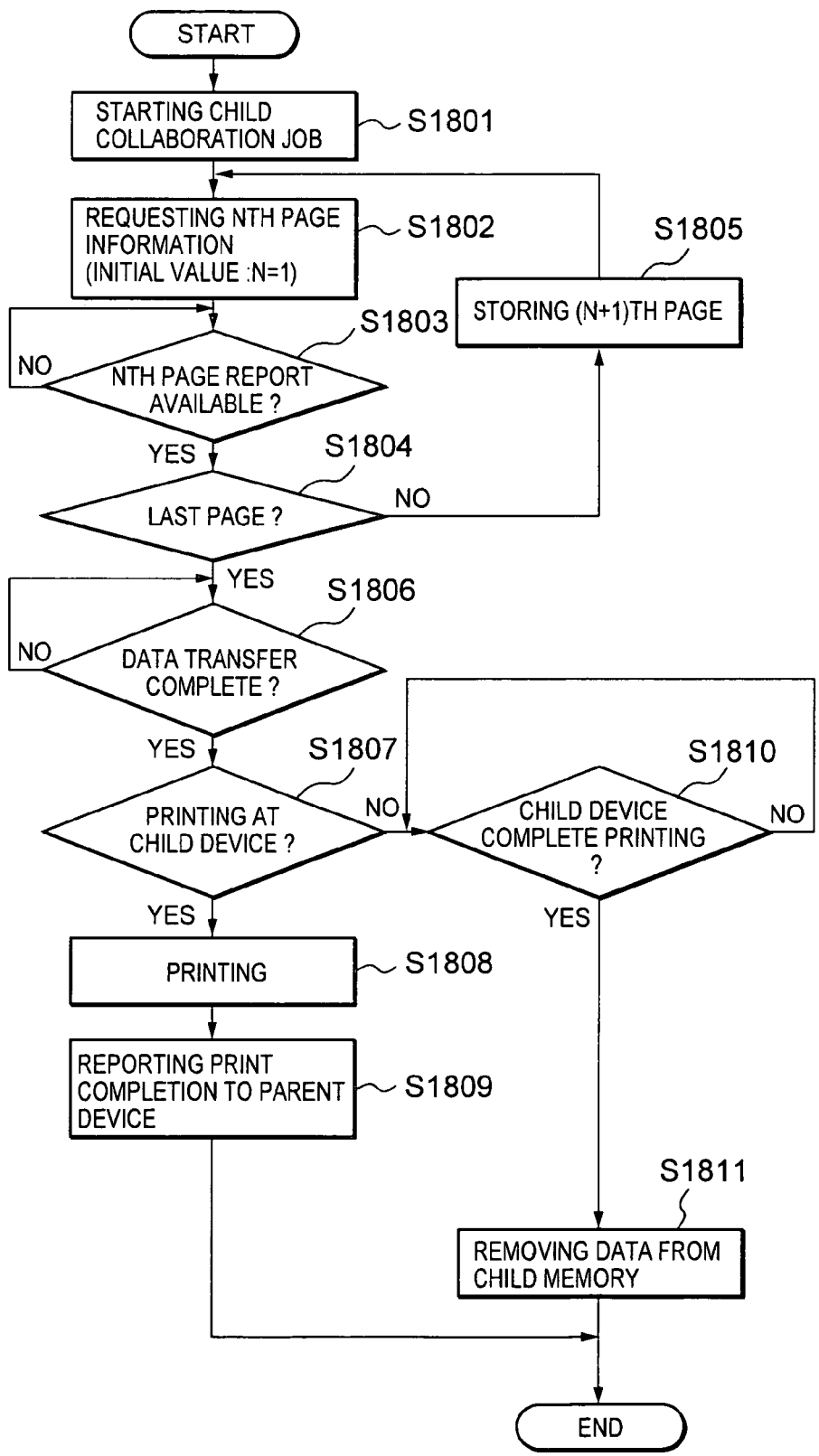
FIG. 18 is a flow chart illustrating steps involved in a preferred process of printing image data at the child device during collaboration according to the current invention.

Now referring to FIG. 18, a flow chart illustrates steps involved in a preferred process of printing image data at the child device during collaboration according to the current invention. After a collaboration job starts by pressing the print key at the parent device, the collaboration job start is requested from the parent device to the child device as in the step S1701 of FIG. 17. The preferred process for the collaboration job at the child device thus starts in a step S1801. After the child collaboration job starts, the child device transfers a request in a step S1802 for the Nth page image information data. The value of the Nth page is initialized to N=1. In a step S1803, the child device waits for a response from the parent device. If the response is not received in the step S1803, the preferred process waits by repeating the S1803. The response includes the image data that the parent device transfers to the child device in the step S1703 of FIG. 17. After the child device receives the Nth page image information, the (N+1) page image information is received. It is then determined in a step S1804 whether or not the (N+1) image information includes a flag for "no information" to indicate that the previous image information page is the last page. If it is determined in the step S1804 that the (N+1) page is not the last page, the image data is stored in the child device in a step S1805. The preferred process then returns to the step S1802 to request for the next image page information.

On the other hand, if it is determined in the step S1804 that the received image page is the last page, the (N+1) page does not contain the image information. That is, the Nth page is the last page. The preferred process in the child device further determines whether or not the child device has received the report from the parent device about the image transfer completion in a step S1806. If it is determined in the step S11806 that the completion report has not been received at the child device, the preferred process waits for the reception by repeating the step S1806. The completion report that the child device waits is the one from the parent device in the step S1707 in FIG. 17. On the other hand, if it is-determined in the step S1806 that the completion report has been received at the child device, the preferred process at the child device now asks the parent device in a step S1807 whether or not the child device performs the printing on the received image, data. If it is determined in the step S1807 that the parent device sends permission to the child device for printing, the child device executes printing in a step S1808. The child device sends print result information indicating a successful completion upon completing one set of documents to the parent device in a step S1809. The parent device receives the above print result information and determines whether or not the child device has completed the allocated print task based upon the received print result information in the step S1711 in FIG. 17. On the other hand, if the child device receives a print NG response for disallowing the print in the step S1807, the preferred process determined whether or not the child device has completed the allocated print task in a step S1810. If it is determined in the step S1810 that the child device has not completed its allocated printing, the preferred process repeats the step S1810.

After it is determined in the S18180 that the child device has completed its printing, regardless of the print status of the parent device, the preferred process removes the image data in the child HDD73 or the child image memory 66 in a step S11811. The preferred process removes all at once every page from the first to the last page in the child device. Thus, the printing operation at the child device is completed according to the current invention.

Figure 19:
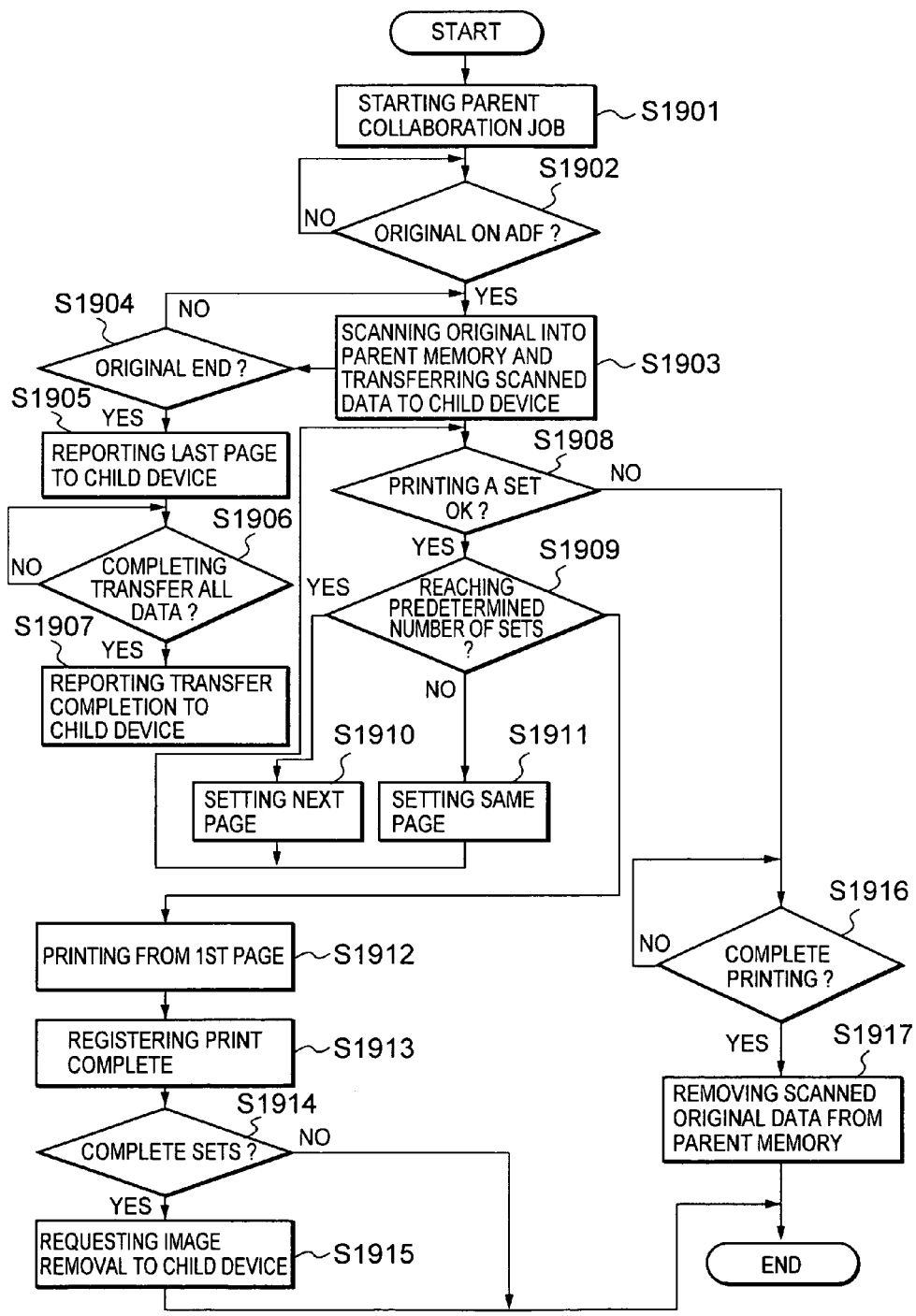
FIG. 19 is a flow chart illustrating steps involved in a preferred process of printing image data at the parent device during collaboration according to the current invention.

Now, referring to FIG. 19, a flow chart illustrates steps involved in a second preferred process of printing image data at the parent device during collaboration according to the current invention. The child device and the parent device are connected through the IEEE 1394 interface. The parent device reads or scans the original documents, and the scanned image data is distributed to the child device through the above interface for the collaboration. First, the parent collaboration process will be described. After the parent collaboration key 40 is pressed, the parent device determines whether or not an image forming device as a child device exists and is connected to the parent device through the above interface. If the above child device exists, the collaboration copy key 40 is now reversed for display to indicate that the parent device is now connected to the child device. In a step S1901, the print key 34 as shown in FIG. 4 indicates that it is ready for a copy job by changing its display color to a predetermined color such as green. If a print key is pressed, the preferred process in the parent device determines in a step S1902 whether or not an original exists in the original tray 2 of the ADF I of FIG. 1. If the preferred process determines in the step S1902 that no original document exists, the preferred process waits for an original to be placed in the original tray 2 and displays a message such as "Document Size Not Detected" in the message area as shown in FIG. 5.

On the other hand, if the preferred process determines in the step S1902 that the original exists, the original is scanned by the scanning unit 50 after it is placed on the contact glass 6 via the transfer belt 4 and the transfer roller 3. The image data is transferred from the parent device to the selected child device via the collaboration interface in a step S1903. The image data includes the scanning direction dot number, an image transfer paper size code, a resolution level, an image direction, a printing surface and an image format as well as the scanned image data. The image data is used to print the image at the child device. The image scanning dot number is a number of dots in the scanning direction for a range of writing. The transfer paper size code is used to automatically select the paper tray. The image direction is an output rotational angle for printing. The printing surface data indicates one-side, both side front surfaces or both sides back surfaces. While the scanned image is transferred from the parent device to the child device via the collaboration interface, it is also stored in the memory 66 at the parent device for later printing. For multiple sets of sort printing, an image is temporarily stored in the HDD 73 in order to write the image in the memory 66.

Still referring to FIG. 19, the parent device concurrently performs the scan and sort print handling in parallel in a step S1903. The preferred process at the parent device in a step S1904 determines whether or not the last page has been scanned. If it is determined that the last page has not been scanned in the step S1904, the preferred process returns to the step S1903 to resume scanning. On the other hand, if it is the last page in the step S1904, the parent device reports to the child device about the last page in a step S1905. Subsequently, the preferred process determines in a step S1906 whether or not all of the scanned images have been transferred to the child device. If not all of the images have been transferred as determined by the step S1906, the preferred process repeats the step S1906 to wait for the image data completion. When the preferred process determines in the step S1906 that the image transfer has completed, the parent device reports the child device about the completion in a step S1907. Lastly, the preferred process terminates itself.

On the other hand, in parallel with the above described scanning and transferring of the image data, the preferred process determines in a step S1908 whether or not the parent device itself performs a set of copies for the sort printing. During the sort printing, since the parent device and the child device divide printing by the set, the above set determination takes place at the beginning of the print task. At the parent device, each set is printed from the beginning while at the child device, each set is printed from the last page in order to maximize productivity. If it is determined in the step S1908 that certain sets are printed at the parent device, the parent device further determines in a step S1909 whether or not a number of copies has reached a predetermined print number. If it is determined in the step S1909 that a number of copies for the allowed page has reached the predetermined number, the parent device now sets the inquiry page to be the next page in a step S1910. On the other hand, if it is determined in the step S1909 that a number of copies for the allowed page has not reached the predetermined number, the parent device now sets the inquiry page to be the same page in a step S1911. Until all of the images are determined, the preferred process returns to the step S1908 and repeats the steps S1908, S1909, S1910, and S1911. When every page is determined in the step S1909, the preferred process proceeds to a step S1912, where the printing is executed from the first page. The parent device registers the successful print result for each image at the time of output in a step S1913. It is determined in a step S1914 whether or not a predetermined number of copies has been printed. If it is determined in the step S1914 that the predetermined number has been completed, a removal request is transferred to the child device for the image in a step S1915. On the other hand, it is determined in the step S1914 that the predetermined number of copies has not been printed, the preferred process terminates itself without sending the removal request. If the preferred process determines in the step S1908 that there is no divided portion for the parent device, the parent device determines in a step S1916, whether or not the parent device and the child device have respectfully completed a divided portion or an allocated of the printing. If it is determined in the step S1916 that both the child device and the parent device have completed the allocated portion, the image data is removed from the HDD73 or the image memory 66 in a step S1917 before the preferred embodiment terminates itself.

To summarize the above flow chart in FIG. 19, the above steps are grouped into three categories. A first category is related to transferring of the image data and includes the steps S1904 through S1907. A second category is related to printing of the image data and includes the steps S1908 through S1913. A third category is related to removing of the image data and includes the steps S1914 through S1917. For each set of copies, the above described flow including the steps 1901 through 1917 is initiated from the START to the END. The steps S1909 through S1915 are performed for each set of copies, and the steps S1915 and S1917 are performed after the printing is complete. Since there is no more set of copies to be printed in the NO branch of the step S1708, it means that the last set of copies was made. The S1711 is thus performed after printing.

Figure 20:
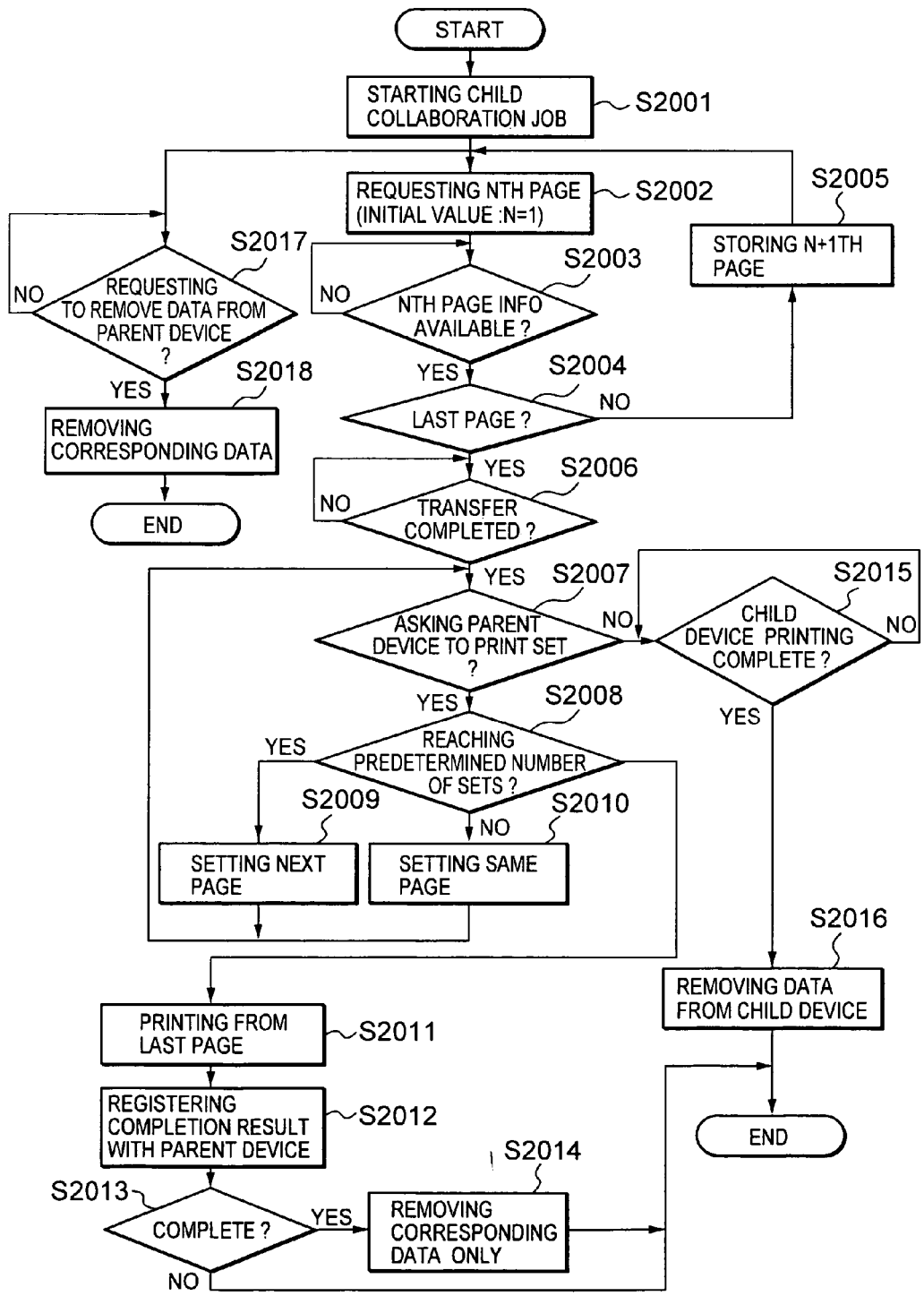
FIG. 20 is a flow chart illustrating steps involved in a preferred process of printing image data at the child device during collaboration according to the current invention.

Now, referring to FIG. 20, a flow chart illustrates steps involved in a preferred process of printing image data at the child device during collaboration according to the current invention. After a collaboration job starts by pressing the print key at the parent device, the collaboration job start is requested from the parent device to the child device as in the step S1901 of FIG. 19. The preferred process for the collaboration job at the child device thus starts in a step S2001. As the collaboration job starts, the child device sends an image information request for the Nth page to the parent device in a step S2002. The initial valve of N is one. The child device waits for an image information response from the parent device in a step S2003, if the Nth page information has not been received in a step S2003, the preferred process waits by repeating the step S2003. The response includes the image data that the parent device transfers to the child device in the step S1903 of FIG. 19. After the child device receives the Nth page image information, the (N+1) page image information is received. It is determined in a step S2004 whether or not the (N+1) image information includes a flag for "no information" to indicate that the previous image information page is the last page. If it is determined in the step S2004 that the (N+1) page is not the last page, the image data is stored in the child device in a step S2005. The preferred process then returns the step S2002 to request for the next image page information. On the other hand, if it is determined in the step S2004 that the received image page is the last page, the (N+1) page does not contain the image information. That is, the Nth page is the last page. The preferred process in the child device further determines whether or not the child device has received the report from the parent device about the image transfer completion in a step S2006. If it is determined in the step S2006 that the completion report has not been received at the child device, the preferred process waits for the reception by repeating step S2006. The completion report that the child device waits for is the one from the parent device in the step S1907 in FIG. 19.

On the other hand, if it is determined in the step S2006 that the completion report has been received at the child device, the preferred process at the child device now asks the parent device in a step S2007 whether or not the child device performs the printing on each of the received image data. Unlike the parent device, the inquiring image is from the last page to maximize the productivity as described before. If it is determined in the step S2007 that the parent device sends a permission to the child device for printing, the child device executes printing in a step S2011 from the last page after determining on the next page for the print execution inquiry in steps S2008, S2009 and S2010. It is determined in the step S2008 whether or not a number of allowed copies for printing have reached a predetermined allocated number. If it is determined in the step S2008 that the number of allowed copies has reached the predetermined number, the child device now sets the page for inquiry to be the previous page in the step S2009. However, if it determined in the step S2008 that the number of copies for the allowed page has not reached the predetermined number, the child device now sets the page for inquiry to be the same page in a step S2010. After all the pages have been determined for final print execution in the above steps, S2007, S2008, S2009, and S2010, the pages are printed from the last page in a step S2011. The child device reports to the parent device the successfully printed result for each image at the time of output in a step S2012. It is determined in a step S2013 whether or not a predetermined number of copies has been printed by the child device. If it is determined in the step S2013 that the predetermined number of copies has been printed, the preferred process removes only the completed image from the HDD73 or the image memory 66 in the child device in a step S2014. On the other hand, if the printed copies have not reached the predetermined number, the preferred process bypasses the step S2014 and terminates. Furthermore, if it is determined in the step S2007 that the child device finds no allocation for printing for itself, the preferred process further determines in a step S2015 whether or not the child device has completed the printing of the allocated images. If the allocated printing has not been completed, the preferred process repeats the step S2015 until the child device finishes. On the other hand, if it is determined in the step S2015 that the printing allocated at the child device is completed, the child device removes the image from the memory in a step S2016 and the preferred process terminates itself.

Lastly, in parallel with the above described steps, the preferred process determines in a step S2017 whether or not the child device has received from the parent device a request to remove a particular image after the child job started in the step S2001. If it is determined in the step S2017 that the child device has not received an image removal request from the parent device, the step S2017 is repeated until such a request is received. The preferred process removes in a step S2018 the image corresponding to the request received in the step S2017 from the HDD73 or the image memory 66 at the child device. The above image removal request corresponds to the request that the parent device transmits to the child device in the step S1915 in FIG. 19. As described above, the image removal timing at the child device includes three patterns. The first pattern is when the child device alone completes all of the allocated printing as in the step S2014. The second pattern is when the child device completes the printing even if there is no allocation of printing as in the step S2016. Lastly, the third pattern is when the parent device alone completes the print job and the image removal request has arrived as in the step S2018.

Now referring to FIGS. 19 and 20, the interactions between the parent device and the child device are described during the collaboration process according to the current invention. In the steps S1908 and S1909 of FIG. 19, it is determined whether or not the parent device has been allocated to print a share of the collaboration print job and that share has been completed. The parent device keeps track of a completed portion of the entire collaboration print job by registering the print completion result in the step S1913. Similarly, in the steps S2007 and S2008 of FIG. 20, it is determined whether or not the child device has been allocated to print a share of the collaboration print job and that share has been completed. The child device also sends the parent device its print completion result in the step S1012 so that the parent device keeps track of the completed portion of the entire collaboration print job. This monitoring process allows the parent device and the child device to flexibly reallocate the remaining portion of the collaboration print job between the parent device and the child device depending upon the printing conditions at the parent device and the child device. In other words, although the initial allocation of the collaboration print job takes place at the onset of the collaboration print process, the collaboration print job is flexibly completed between the parent device and the child device as the process progresses.

Figure 21:
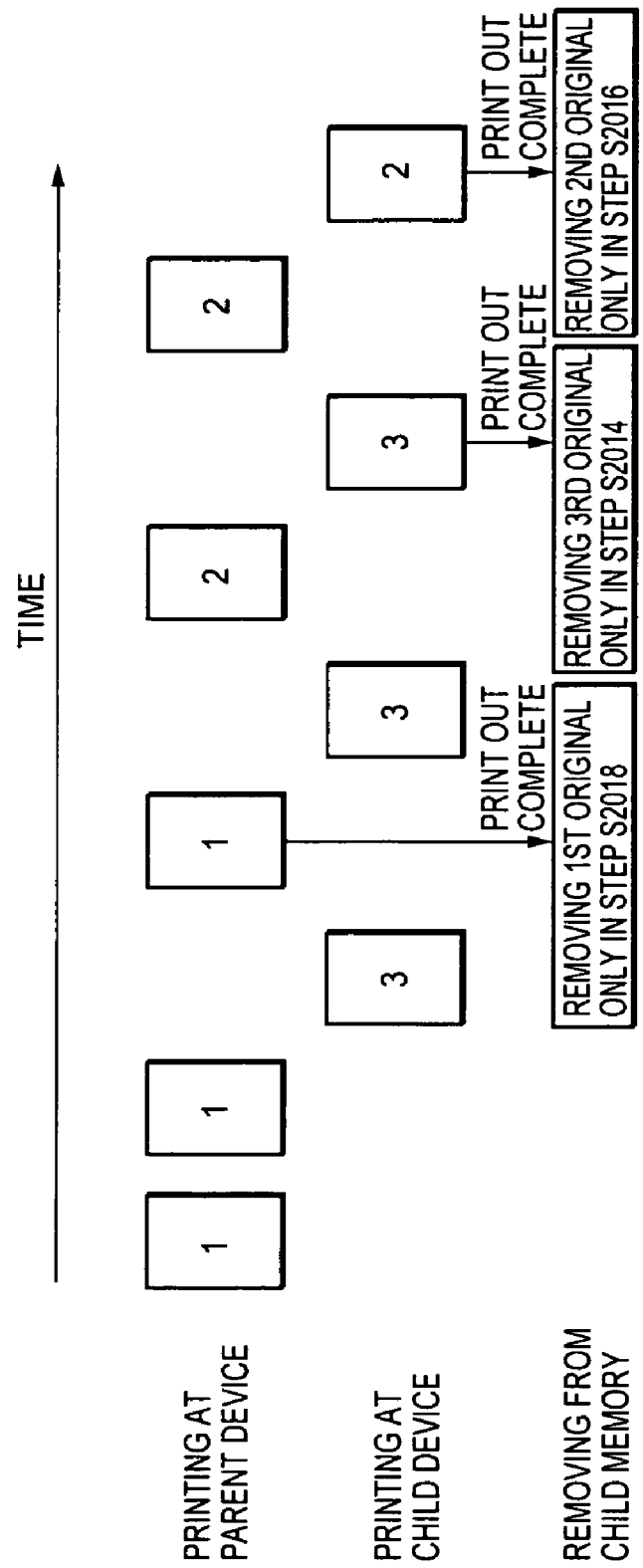
FIG. 21 is a diagram illustrating how an exemplary collaboration task is performed according to the current inventor.

Now referring to FIG. 21, a diagram illustrates how an exemplary collaboration task is performed according to the current invention. In this example, the original has three pages, and three sets or copies are to be made into a stack. The parent device executes printing of the first and second copies of the first page original as in the step S1908 of FIG. 19. Then, in the child device, a third copy of the final third page is determined to be printed as in the step S2007 in FIG. 20. In the following order, the third copy of the first original page is permitted to be printed and is printed at the parent device. The parent device sends a request to the child device to remove the first image data from the child device as in the step S2018 of FIG. 20. A second copy of the third original page is permitted to be printed and is printed at the child device. A first copy of the second original is permitted and printed at the parent device. A first copy of the third original is permitted and printed at the child device. A second copy of the second original is permitted and printed at the parent device. Lastly, a third copy of the second original is permitted and printed at the child device. When the third copy of the third original is completed for output at the parent device, the image only for the third original is removed from the child device as in step S2014 in FIG. 20. When the child device no longer has any printing after third copy of the second original, only the second image is removed in the step S2016 in FIG. 20 subsequent to the printing. As described above, during the stack print handling, the parent device transfers to the child device a removal request of the print data which the parent device has completed the entire number of print copies as in the case of the first original. In response to the received removal request, the child device removes the corresponding print data from the HDD73 or the image memory 66. Also during the stack print process, the child device removes from the HDD73 or the image memory 66 the print data that the child device has printed an entire number of requested copies. Furthermore, during the stack printing, the child device removes from the HDD73 or the image memory 66 the print data for a number of print request copies that is a total of print completed copies by the child device and copies that are not permitted for printing.

As described above, in the preferred embodiments, more than two image forming devices such as a parent device and a child device are connected in the image forming system. The parent device includes a scanning means for scanning originals, a memory means for storing the scanned image, a print means for printing the stored image, and a collaboration means for communicating with the child device to transmit and receive the image. The parent device transmits the scanned image to the child device via the collaboration means and stores the transmitted image in the child device. Thus, the parent device and the child device divide the sort print task. The parent device removes the image from the memory at the child device upon completing the allocated print at the child device regardless of the print status at the parent device so that the child memory resource is sufficiently utilized. In another preferred embodiment, more than two image forming devices such as a parent device and a child device are connected in the image forming system. The parent device includes a scanning means for scanning originals, a storing means for storing the scanned image, a print means for printing the stored image, and a collaboration means for transferring the image to the child device. The parent device transfers the scanned image to the child device via the collaboration means and stores it at the child device. The parent device and the child device divides the stack print task. Upon completing the copies at the parent device, the corresponding image is removed from the child memory means so that the child memory resources are sufficiently utilized.

In yet another preferred embodiment, more than two image forming devices such as a parent device and a child device are connected in the image forming system. The parent device includes a scanning means for scanning originals, a storing means for storing the scanned image, a print means for printing the stored image and a collaboration means for transferring the image to the child device. The parent device transfers the scanned image to another device via the collaboration means and stores it in the storing means. The stack print task is divided. When a number of copies is completed at the child device, the image is removed from the storing means at the child device so that the child memory resource is sufficiently utilized. The image forming device performs the processes for the data transmission and reception, the data storage and the data removal. The above processes are executed by the computer program that the image forming device has. Alternatively, the above program is stored in a recording medium such as an optical recording medium, a magnetic recording medium, a magneto-optical recording medium or a semiconductor medium, and the program is loaded from the recording medium. The program may be also alternatively loaded from an external device via a network.

Figure 22:
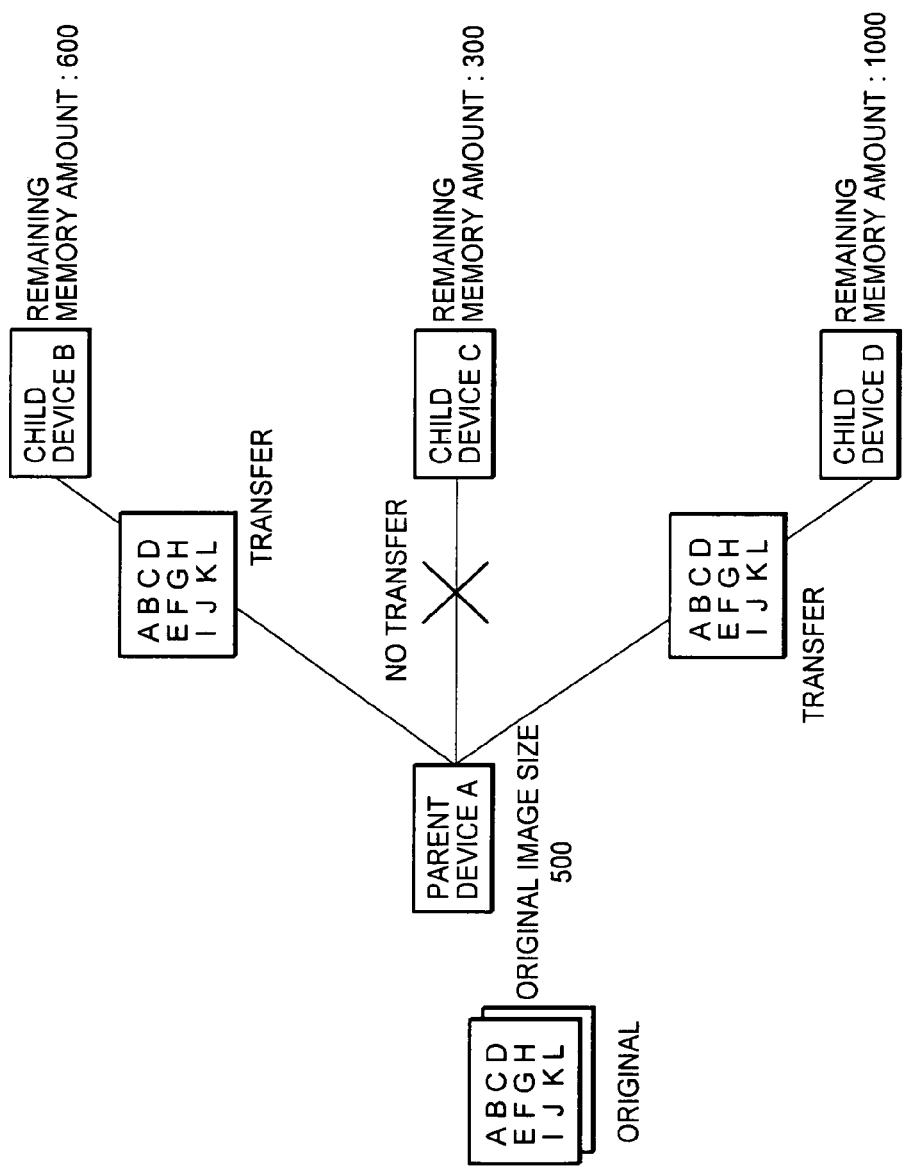
FIG. 22 is a diagram illustrating operational environment of the image forming devices according to the current invention.

Now referring to FIG. 22, a diagram illustrates operational environment of the image forming devices according to the current invention. Assuming that the original image size that is or has been scanned by a parent device A is 500 in an arbitrary unit, and that the remaining memory amount at the child devices B, C, and D is respectively 600, 300 and 1000 in the arbitrary unit. The remaining memory size at the child device C is smaller than the scanned image size. The parent device thus does not transfer the image to the child device C while the child devices B and D receive the image and start the collaboration operation.

Now FIG. 23 is a display example illustrating the remaining memory size in the child device for collaboration according to the current invention. The display indicates the detail of the child devices B and D as shown in FIG. 22 whose remaining memory amount is larger than the original image. The operator selects a child device for dividing the job based upon the above information. The operator also learns the use of the child devices. Other information includes the paper tray, printing speed, the location and so on.

Figure 24:
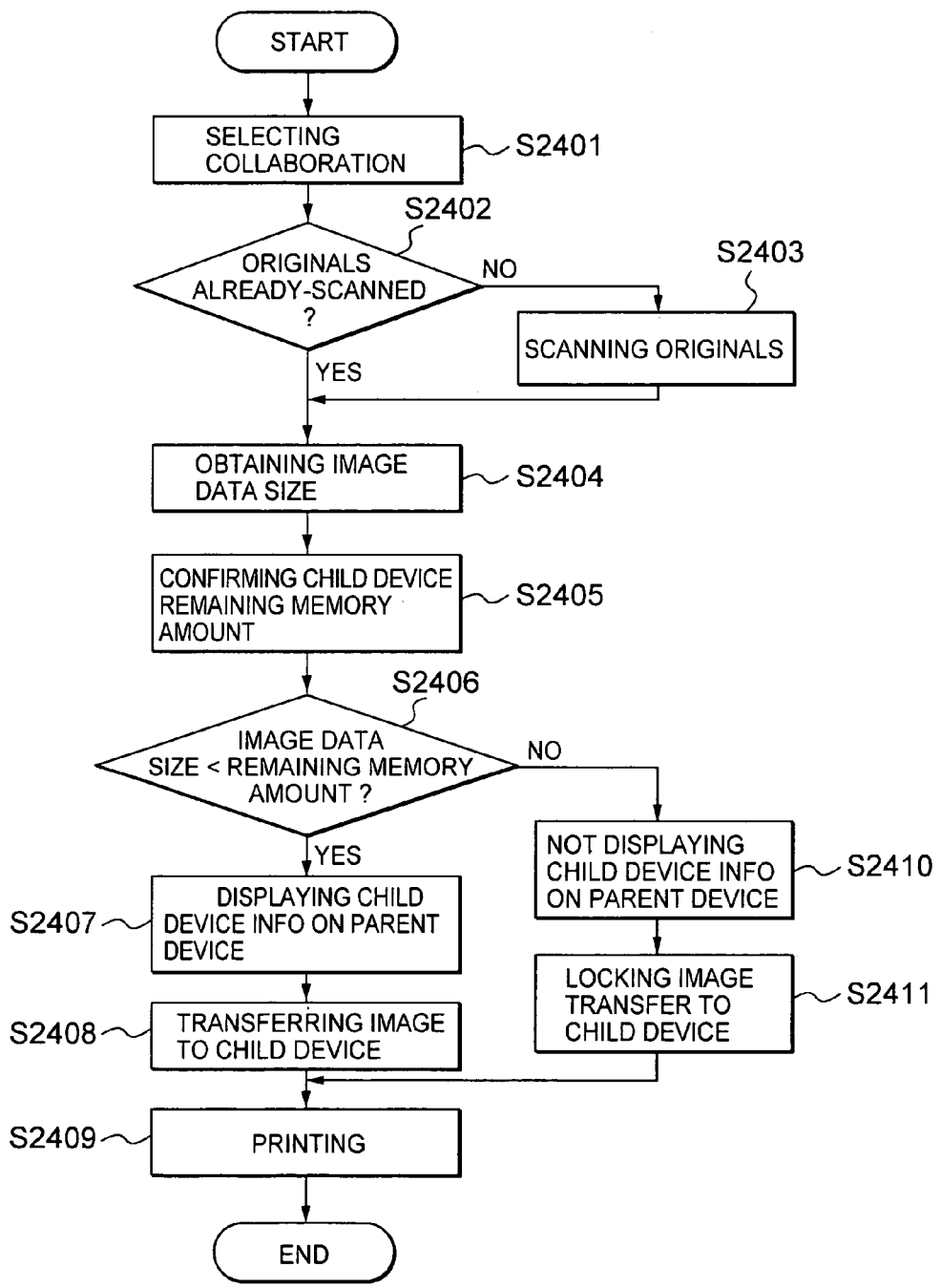
FIG. 24 is a flow chart illustrating steps involved in a preferred process of monitoring a remaining memory amount during the collaboration between the image forming devices according to the current invention.

Now referring to FIG. 24, a flow chart illustrates steps involved in a preferred process of monitoring a remaining memory amount during the collaboration between the image forming devices according to the current invention. After selecting collaboration in a step S2401, it is determined in a step S2402 whether or not an original has been scanned and stored. If it is decided in the step S2402 that the original has not been stored, the original is scanned in a step S2403. On the other hand if the original has been already stored, the preferred process proceeds to a step S2404, where the original size is obtained. Subsequently, the parent device confirms the remaining memory amount in the child device via network in a step S2405. The child remaining memory amount is compared to the image data size in a step S2406. If it is determined in the step S2406 that the child remaining memory size is larger than the current image size, the child information is displayed to the parent display device in a step S2407. Then, the image data is transferred to the child device in a step S2408. Finally, the child device that received the image data and the parent device perform the collaboration and print the image data in a step S2409. On the other hand, if it is determined in the step S2406 that the remaining memory amount is not larger than the image data size, the child device information is not displayed at the parent device in a step S2410. Then, the image transfer to the child device is locked in a step S2411. The above described preferred process prevents the child process from having a memory full situation by comparing the remaining memory in advance of the image transfer and locking the memory transfer so that the collaboration efficiently works among the parent and child devices.

Now referring to FIG. 25, a diagram illustrates an exemplary parent display at the parent device in a preferred embodiment according to the current invention. The parent device display includes the status information, the device name, the remaining memory amount, the remaining paper amount, the remaining toner amount, the print speed and the location. In addition, the parent display includes the detailed information on the child device to which a collaborative job has been assigned. In this example, the collaboration Job No 3 has been assigned to a child device, Device B.

Now referring to FIG. 26, a diagram illustrates an exemplary child display at the child device in a preferred embodiment according to the current invention. The child device display includes the status, the remaining memory amount, the remaining paper amount, the remaining toner amount, the print speed and the location. In addition, the child device display includes the detailed information on the assigned job and the parent device which has assigned the job. In this example, the job No 3 has been assigned from the device name A, and the number of jobs is one. In addition, the assigned job information includes the parent device name, the print mode, the number of originals, the number of copies and the color mode.

Figure 27:
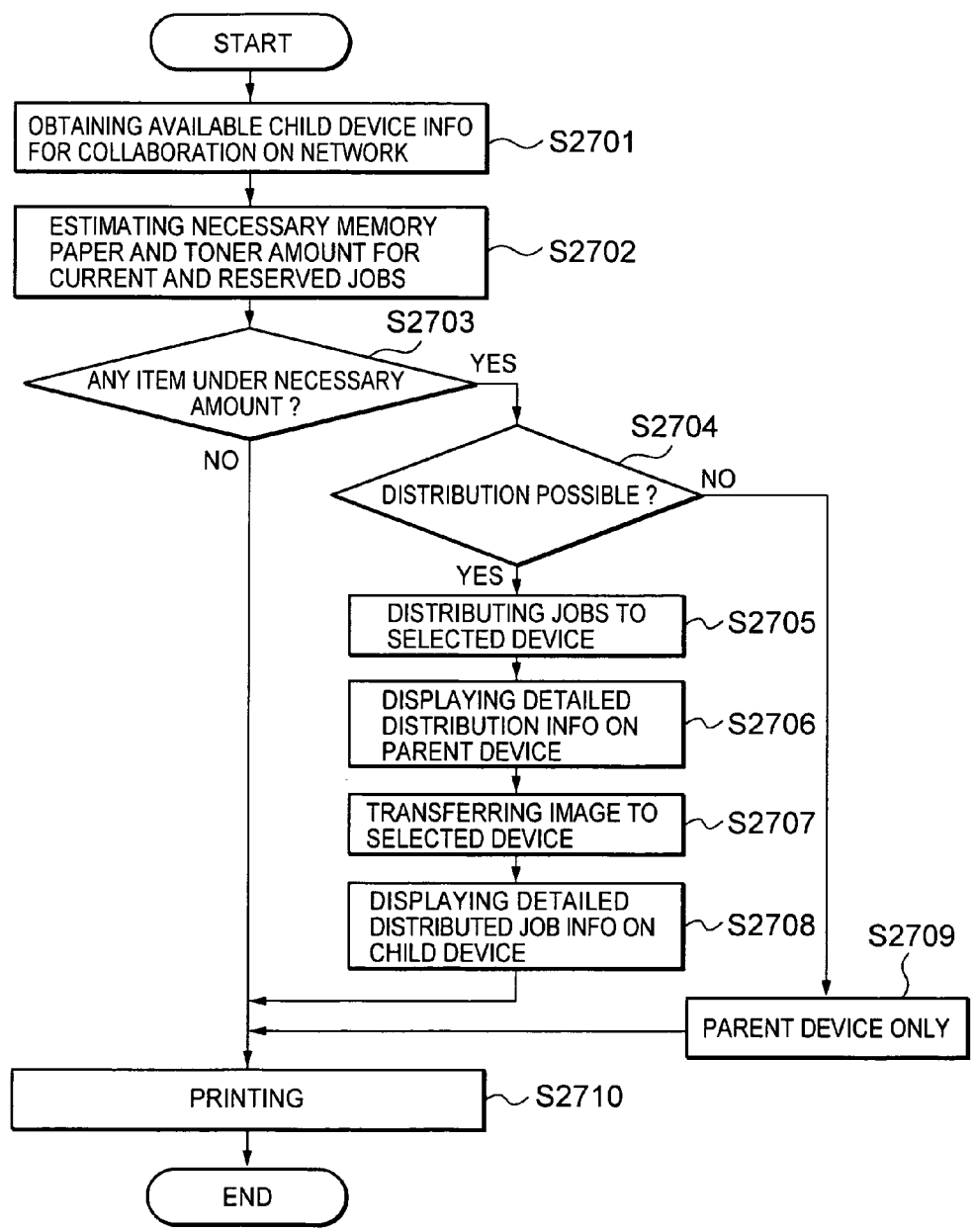
FIG. 27 is a flow chart illustrating steps involved in a preferred process of determining the assignment for a collaboration job according to the current invention.

Now referring to FIG. 27, a flow chart illustrates steps involved in a preferred process of determining the assignment for a collaboration job according to the current invention. In a step S2701, it is always monitored via the network to obtain the detailed information on the child device or the image forming device whose parent device has the collaboration function and that an operator directly operates. In a step S2702, the preferred process estimates a necessary amount of memory, paper and toner for a reservation job after a print job is executed at the parent device. In a step S2703, it is determined whether or not all of the jobs at the parent device are executed without wait on additional supply based upon the remaining memory, the remaining paper and the remaining toner that have been monitored in the step S2701. If it is determined in the step S2703 that there is no item that requires supply for the jobs at the parent device, the jobs are executed at the parent device alone in a step S2710. On the other hand, if it is determined in the step S2703 that at least one item needs to be supplied or waited at the parent device, it is further determined in a step S2704 whether or not the job is assigned or distributed to a child device on the network under the monitor. If it is determined in a step S2704 that the job can be assigned, the job assignment is executed at the selected child device in a step S2705. Subsequently, the detail is displayed at the display means at the parent device in a step S2706. The image is transferred to the child device in a step S2707. At the child device, the detail of the assigned job is displayed on a display means in a step S2708. On the other hand, if it is determined in the step S2704 that the job distribution/assignment is not possible to any of the child devices on the network, the parent device alone executes the job in a step S2709. Lastly, the job is executed only by the parent device alone if no assignment is made or by the parent device and the child devices if assignment has been made.

Figure 28:
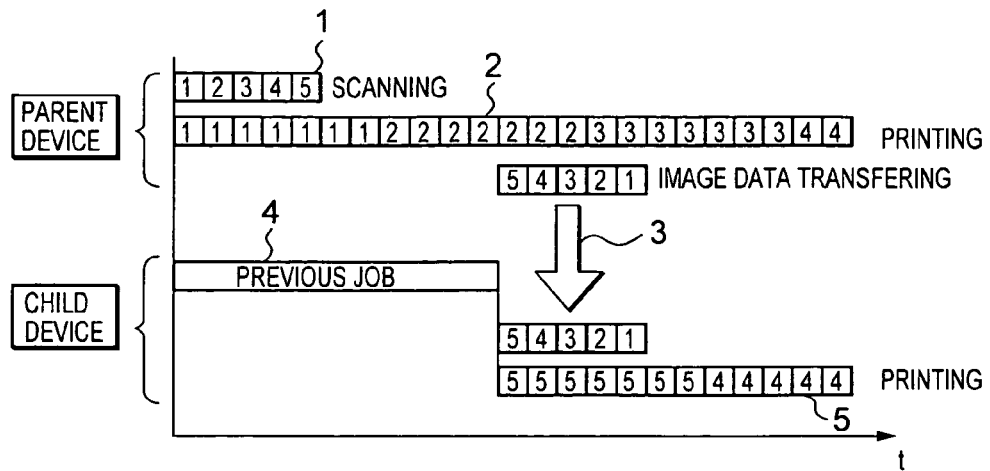
FIG. 28 is a timing diagram illustrating a one-to-one collaboration process in which the collaboration is started while a job is being executed at a child device according to the current invention.

Now referring to FIG. 28, a timing diagram illustrates a one-to-one collaboration process in which the collaboration is started while a job is being executed at a child device according to the current invention. The diagram illustrates time on the horizontal axis. In this example, the original includes five sheets as indicated by the numbers 1 through 5, and the finish is in the stack mode. As the copy operation is started at the parent device, a scanning operation 1 is executed while a printing operation 2 begins to execute for the seven copies. As the originals 1 through 5 are being scanned, a first page is printed seven times, and then the second page is repeated for seven times to follow. While the above operations take place at the parent device, a previous job is being executed in an operation 4 at the child device. For this reason, the current job becomes a reserved job for collaboration at the child device. The reserved job starts after the previous job is completed. When the previous job operation 4 ends, the scanned image is transferred from the parent device to the child device during an operation 3 upon the collaborative child job is available. During the above image transfer, the scanned image is transferred in a reverse order from the scanned order. In this example, the original No 5 is transferred first to the child device during the transfer operation 3. The print image is ready for printing as soon as prepared at the child device. The child device prints from the original No 5 in a print operation 5 as it is received first. Again as in the parent device, each original is printed seven times at the child device in this example. After the total output from the parent device and the child device completes the required amount of printing, the job is finished.

Figure 29:
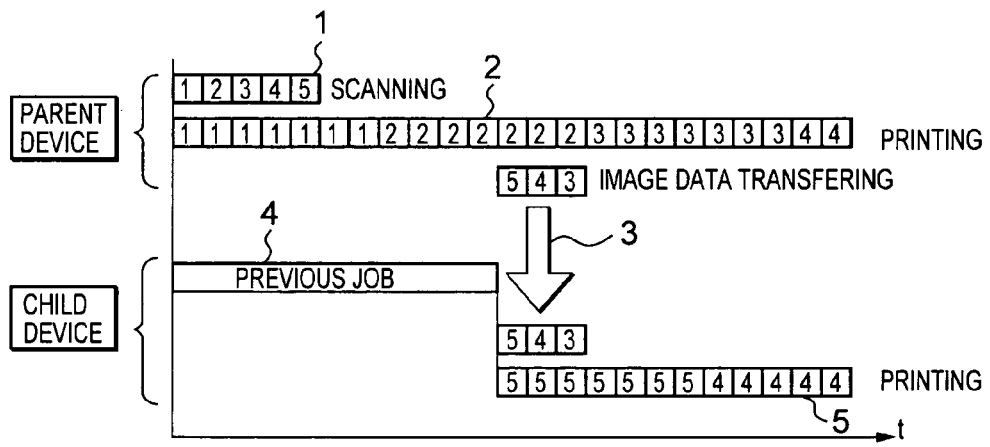
FIG. 29 is a timing diagram illustrating a one-to-one collaboration process in which the collaboration is started while a job is being executed at a child device and only a limited portion of the scanned image is transferred to the child device according to the current invention.

Now referring to FIG. 29, a timing diagram illustrates a one-to-one collaboration process in which the collaboration is started while a job is being executed at a child device and only a limited portion of the scanned image is transferred to the child device according to the current invention. The diagram illustrates time on the horizontal axis. In this example, the original includes five sheets as indicated by the number 1 through 5, and the finish is in the stack mode. As the copy operation is started at the parent device, a scanning operation 1 is executed while a printing operation 2 begins to execute seven copies. As the originals 1 through 5 are being scanned, a first page is printed seven times, and then the second page is repeated for seven times to follow. While the above operations take place at the parent device, a previous job is being executed in an operation 4 at the child device. For this reason, the current job becomes a reserved job for collaboration at the child device. The reserved job starts after the previous job is completed. When the previous job 4 ends, the scanned image is transferred from the parent device to the child device during an operation 3 upon the collaborative child job is available. During the above image transfer, the scanned image is transferred in a reverse order from the scanned order. In this example, the original No 5 is transferred first to the child device during the transfer operation 3. However, at the time when the original No 3 has been transferred from the parent device to the child device during the operation 3, the parent device has completed the printing of the originals No 2 and 1. For this reason, the image data for the originals No 2 and 1 is no longer transferred to the child device during the operation 3. The child device prints the original No 5 as soon as it becomes ready in the order that the pages have been sent. After the total output from the parent device and the child device completes the required amount of printing, the job is finished.

Figure 30:
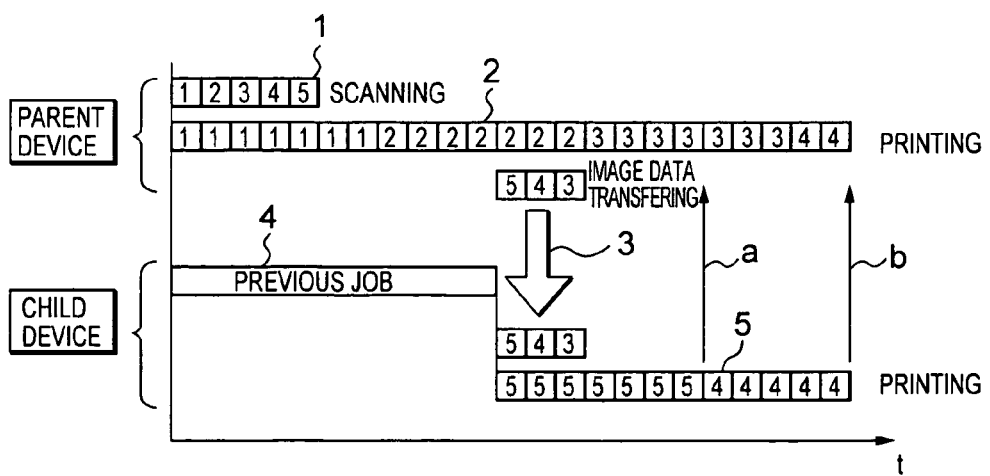
FIG. 30 is a timing diagram illustrating a one-to-one collaboration process in which the collaboration is started while a job is being executed at a child device and only a limited portion of the scanned image is transferred and removed from both the child device and the parent device according to the current invention.

Now referring to FIG. 30, a timing diagram illustrates a one-to-one collaboration process in which the collaboration is started while a job is being executed at a child device and only a limited portion of the scanned image is transferred and removed from both the child device and the parent device according to the current invention. The diagram illustrates time on the horizontal axis. In this example, the original includes five sheets as indicated by the numbers 1 through 5, and the finish is in the stack mode. As the copy operation is started at the parent device, a scanning operation 1 is executed while a printing operation 2 begins to execute seven copies. As the originals 1 through 5 are being scanned, a first page is printed seven times and then the second page is repeated for seven times to follow. While the above operations take place at the parent device, a previous job is being executed in an operation 4 at the child device. For this reason, the current job becomes a reserved job for collaboration at the child device.

The reserved job starts after the previous job is completed. When the previous job 4 ends, the scanned image is transferred from the parent device to the child device during an operation 3. During the above image transfer, the scanned image is transferred in a reverse order from the scanned order. In this example, the original No 5 is transferred first to the child device during the transfer operation 3. However, at the time when the original No 3 has been transferred from the parent device to the child device during the operation No 3, the parent device has completed the printing of the originals No 2 and 1. For this reason, the image data for the originals No 2 and 1 is no longer transferred to the child device during the operation 3. The child device prints the original No 5 as soon as it becomes ready in the order that the pages have been sent. A point a in time indicates that all copies of the original No 5 have been printed at the child device. At this point a, both the child device and the parent device remove the memory for the original No 5. Similarly, a point b in time indicates that all copies of the original No 4 have been printed by the parent and child devices combined. At this point b, both the child device and the parent device remove the memory for the original No 4. Thus, the job is completed when the parent and child devices together output all of the print copies.

Now referring to FIG. 31, a diagram illustrates an exemplary operation of consolidated memory data for the bind mode according to the current invention. When an operator presses the two-side mode and the magazine key on the liquid crystal display touch panel, the magazine bind mode is performed by the image forming device. The scanning unit scans all of the originals from the original tray of the automatic document feeder (ADF). Subsequently, new image data is generated from the scanned image data by combining or consolidating the first and the last page. For example, when the magazine mode is specified for eight pages of the originals No 1 through 8, page Nos. 1 and 8 are combined into an image memory block a. Similarly, page Nos. 7 and 2, 3 and 6 as well as 5 and 4 are respectively consolidated into image memory blocks b, c and d. The consolidated memory blocks a and b are printed on two sides of a single sheet of paper while the consolidated memory blocks c and d are printed on two sides of another sheet as indicated by cross sections views. After these sheets are printed in the above described manner, the two printed sheets are bound together as also shown in a cross sectional view.

Figure 32:
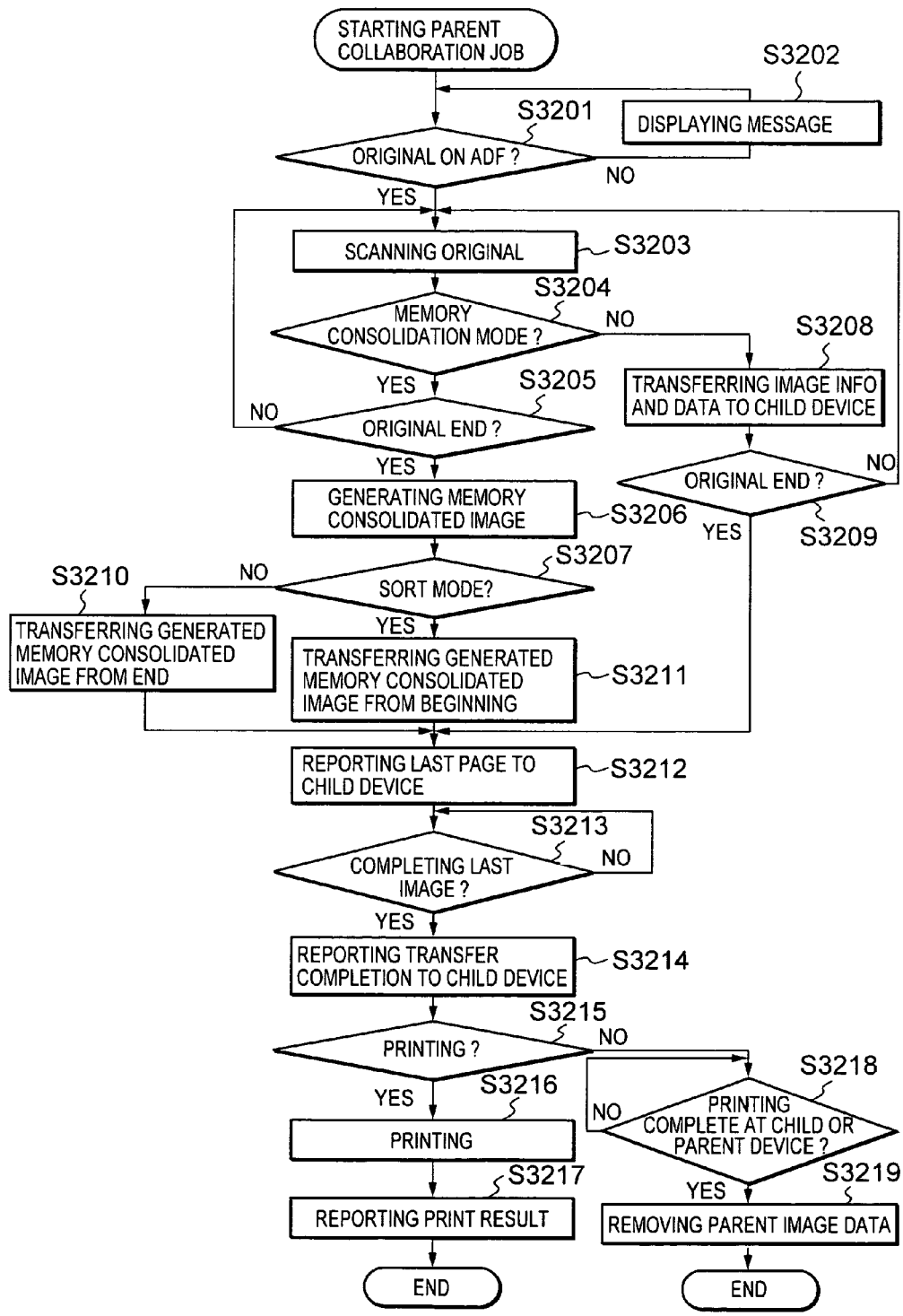
FIG. 32 is a flow chart illustrating steps involved in a preferred process at the parent device for collaboration between the parent and child devices using the consolidated memory mode according to the current invention.

Now referring to FIG. 32, a flow chart illustrates steps involved in a preferred process at the parent device for collaboration between the parent and child devices using the consolidated memory mode according to the current invention. In the following exemplary printing process, the preferred process is illustrated at the parent device. At least, two image forming devices are connected via IEEE 1394 interface. The parent device scans the originals, and the scanned image data is transferred to the child device via the above interface. Thus, the parent and child devices share a print job. After the collaboration copy key 41 of FIG. 5 is pressed, it is determined whether or not an image forming device is connected via the above interface. If it is determined that an image forming device is connected, the collaboration copy key reverses its display color to indicate that the parent device is now connected to another image forming device. At the same time, the print key 34 of FIG. 4 turns green, and the copy status is enabled. For the magazine mode, after the two side key and the magazine key are pressed, the print key is pressed. To scan the originals, it is determined in a step S3201 whether or not an original exists on the ADF or the contact glass. If no original exists, a message such as "original size unknown" is displayed in a step S3202 in the message area of FIG. 5, and the preferred process returns to the step S3201. If, on the other hand, an original exists, the original on the feeding tray is transferred to the contact glass via transfer rollers and belts so that the original is scanned by the scanning unit in a step S3203. Then, it is determined in a step S3204 whether or not the scanned image data is processed in the consolidated memory mode. If it is determined in the step S3204 that the memory mode is not in the consolidated mode, the scanned original image data and information are transferred to the child device in a step S3208. In the non-consolidated memory mode, a copy is made on a single side of the image transfer paper without consolidating the scanned image data.

The image information includes the number of dots along the scanning and subscanning directions, the image transfer size code, the resolution, the image direction, the print surface and the image format data. The image information is transferred from the parent device to the child device via the collaboration interface. The above information is necessary for printing at the child device. The number of dots along the scanning and subscanning directions specifies a range of writing. The image transfer size code automatically selects a tray. The image direction specifies the output rotational angle during printing. The print surface indicates one of the following choices a single side/both front surface/both back surface. The actually scanned image data is also transferred from the parent device to the child device via the collaboration interface, and it is written in the image memory at the parent device. The stored information is read at the time of printing. For a plurality of sort printing, the image data is temporarily stored in HDD to write next image in the image memory. At the parent device, scanning and printing both take place in parallel. In a step S3209, it is determined whether or not the scanned original is the last. If it is determined in the step S3209 that the scanned page is not the last, the preferred process executes printing in the step S3203. On the other hand, if it is determined in the step S3209 that the scanned page is the last page, the preferred process proceeds to a step S3212, where the child device is reported of the last page.

Subsequently, it is further determined in a step S3213 whether or not last image data has been completed for the data transfer. Upon completing the last image transfer in the step S3213, it is reported in a step S3214 that the child device is reported of the last page image data transfer. On the other hand, the preferred process waits for the completion of the last image data transfer in the step S3213. In the sort or stack print process, it is determined in a step S3215 whether or not the image is executed by the parent device. If it is determined in the step S3215 that printing is to be executed by the parent device, the parent device shares its share by executing the printing in a step S3216. In the consolidated mode, the print image is in the consolidated image data while in the non-consolidated mode, the print image is in the original image data. In a step S3217, the successful print result is registered. When it is in the sort print, when one set of copies is completed, the above registration takes place. When it is in the stack print mode, when a copy of the image is completed, the above registration takes place. In case, the preferred process determines in the step S3215 that there is no sharing of printing by the parent device, it is further determined in a step S3218 whether or not the printing as assigned to the child or parent device has been completed. If it is determined in the step S3218 that the printing has been completed, the image data is removed from the HDD or the image memory in a step S3219.

Figure 33:
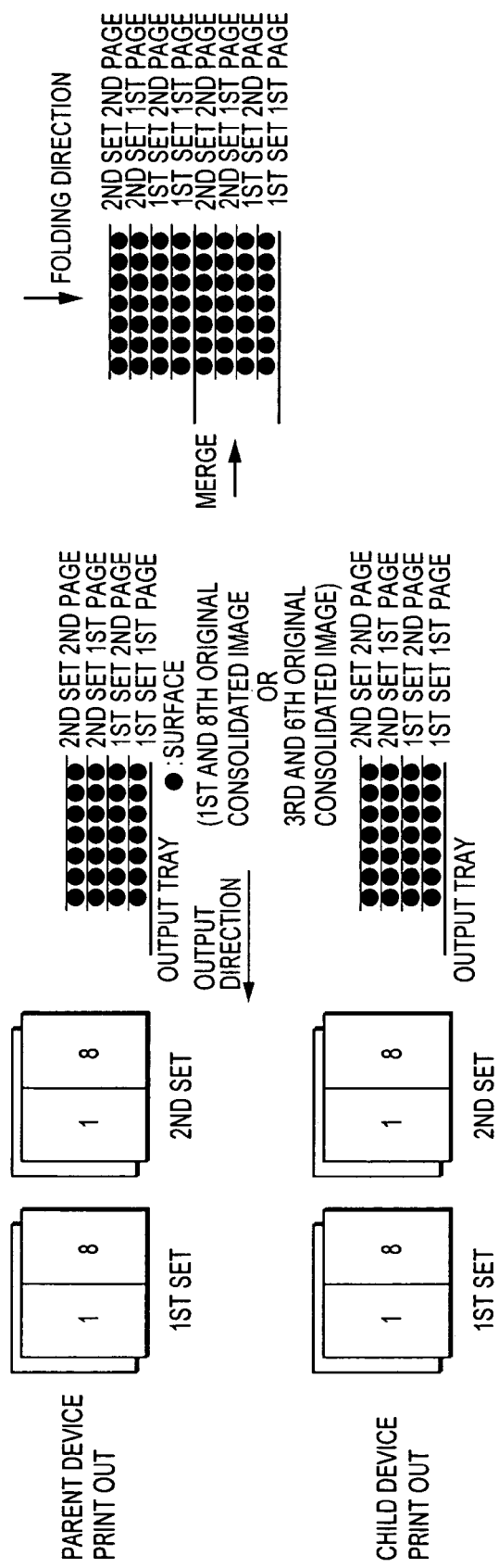
FIG. 33 is a diagram illustrating the print operation in the sort mode according to the current invention.
Figure 34:
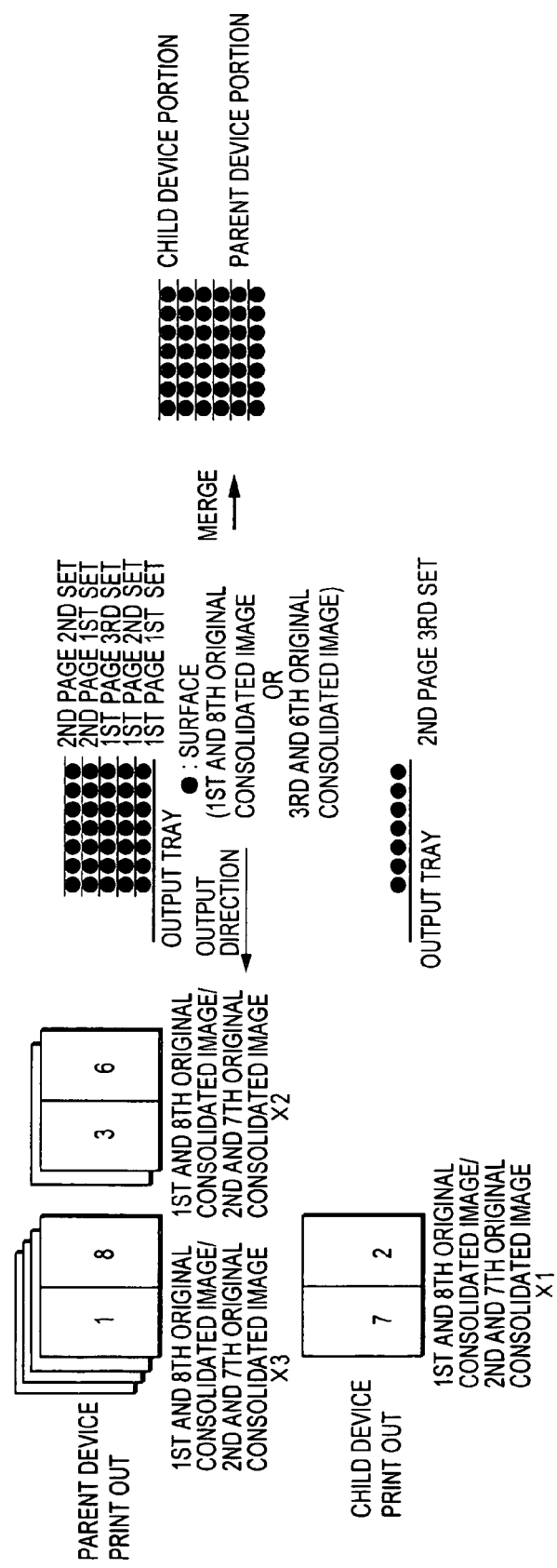
FIG. 34 is a diagram illustrating the print operation in the stack mode according to the current invention.

Still referring to FIG. 32, going back to the step S3204, if it is determined that the memory consolidation mode has been selected for magazines as described with respect to FIG. 31, new image data is generated in a step S3206 after the last original page is confirmed in the step S3205. In the magazine mode, since the last image and the first image are consolidated on the same memory image, the scanning is repeated until the last page is ascertained. In the preferred process, assuming eight originals, the first and the eighth are consolidated in memory as shown in FIG. 31. The print image is subsequently prepared by consolidating the second and seventh images, the third and sixth images, as well as the fourth and fifth images. After the print image is ready, the preferred process proceeds to the print process to perform the parent share of printing as in the non-consolidated mode. After the memory consolidated image is generated from the original image data, it is determined in a step S3207 whether or not the print operation is in the sort or stack mode. If it is determined in the step S3207 that the print is in the sort mode, as illustrated in FIG. 33, the parent device and the child device each first outputs the consolidated image containing the first and eighth pages and then outputs the consolidated image containing the fourth and fifth pages. By merging the above two outputs, the same sort output from a single device is obtained. Since the first and eighth images are outputted from the child device, these images are sent first in a step S3211. On the other hand, if it is determined in the step S3207 that the print operation is in the stack mode, as shown in FIG. 34, the parent device outputs the consolidated image of the first and eighth pages and then the consolidated image of the fourth and fifth pages. Contrarily, the child device outputs the consolidated image of the fourth and fifth pages. Since the parent device has the assignment of two sets, the child device finishes its output after three sets. The output bundles from the parent device and the child device are merged to obtain the same stack output from a single device. However, upon imaging, the child outputs are turned front to back. At the child device, since the images with the fourth and fifth originals are outputted first, the corresponding image data is transferred first in a step S3210.

Figure 35:
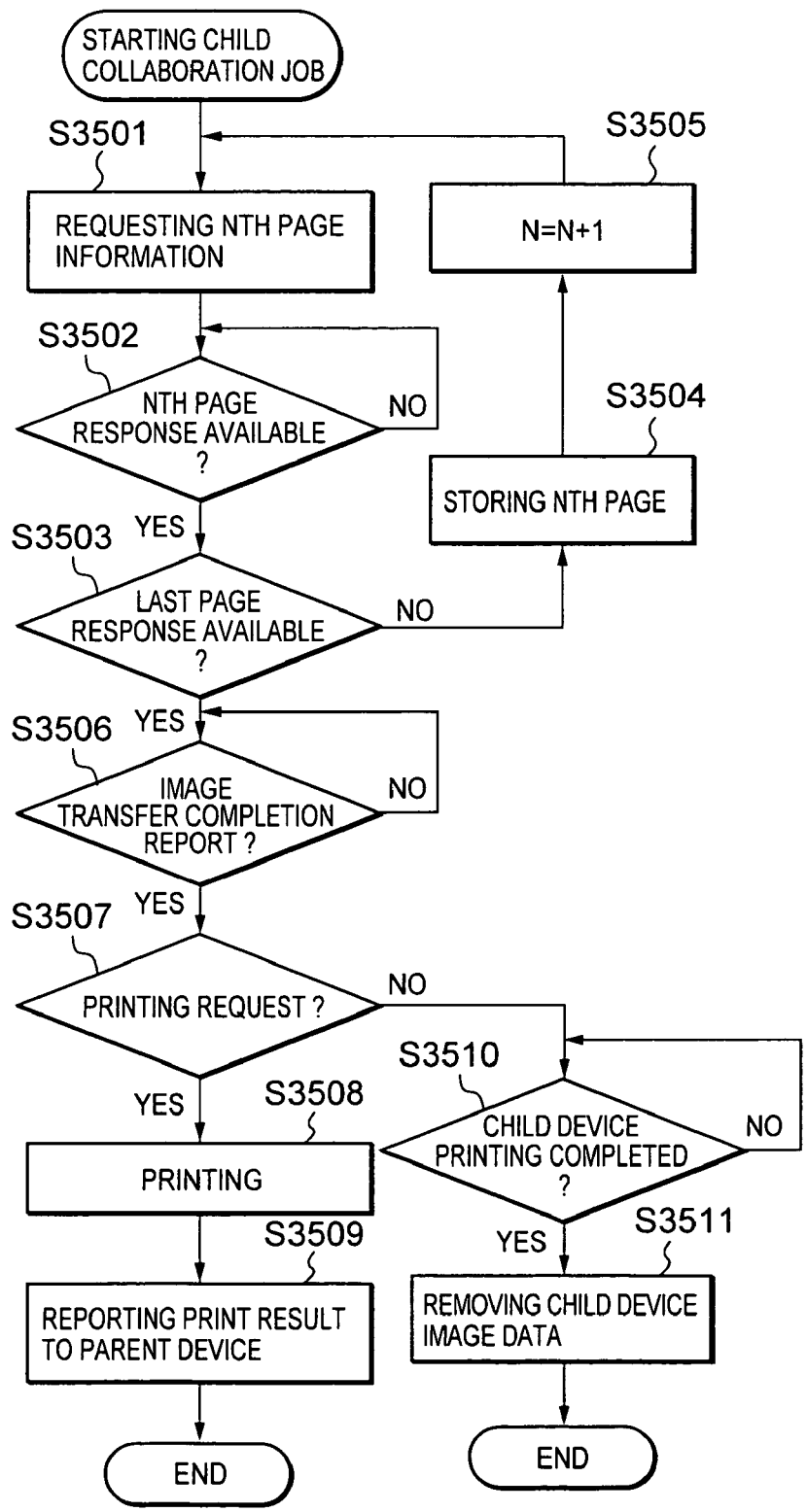
FIG. 35 is a flow chart illustrating steps involved in a preferred process of checking a Nth page in the child device for collaboration between the parent and child devices according to the current invention.

Now referring to FIG. 35, a flow chart illustrates steps involved in a preferred process of checking a Nth page in the child device for collaboration between the parent and child devices according to the current invention. After the collaboration job starts subsequent to the print key depression at the parent device, a collaboration start request is made from the parent device to the child device, and the collaboration job starts at the child device. The image information for the first page is requested in a step S3501 where N=1. In a step S3502, the first page image information response is waited. Upon receiving the response, it is determined in a step S3503 whether or not the received information is for the last page based upon the no-information flag. If it is determined in the step S3503 that the last page has not arrived, the preferred process stores the Nth page image information in a step S3504 and increments the value of N for the next image information in a step S3505. On the other hand, if it is determined in a step S3503 that the last page has arrived, it is further determined in a step S3506 whether or not the child device has received a report from the parent device for indicating that all of the images have been transferred. The preferred process waits for the above report from the parent device. Upon receiving the report, the preferred process transfers an inquiry to the parent device in a step S3507 whether or not the child device is allowed to print the copy. If it is determined S3507 that the copy is to be printed at the child device, the copy is made in a step S3508. Subsequently, a successful print result is sent to the parent device in a step S3509. The print result is sent when a set including the last page is printed if the print mode is in the sort mode. On the other hand, the print result is sent when the image is printed if it is in the stack mode. The above results are used by the parent device to determine whether or not the assigned print task is completed at the child device in the step S3218 of FIG. 32. If it is determined in the step S3507 that the copy is not to be printed at the child device, the preferred process further determines in a step S3510 whether or not the child device has completed its printing. The preferred process waits until the child printing is finished in the step S3510. When it is determined in the step S3510 that the child printing is finished, the preferred process removes the image data from the HDD or the child image memory in a step S3511 regardless of the parent print status. If the print mode is in the sort mode, all image data from the first to the last pages are removed in the step S3511. If the print mode is in the stack mode, only the printed image data is removed in the step S3511.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. An image forming device network system, a parent device including a first image scanning unit for scanning an image to generate image data, a first memory unit connected to the first image scanning unit for storing the image data that has been scanned in by the image scanning unit, a first image forming unit connected to the first memory unit for reading the image data and forming an image on an image-transferring medium and a first control unit connected to the first image scanning unit, the first memory unit and the first image forming unit for controlling the first image scanning unit, the first memory unit and the image forming unit, the first control unit controlling transfer of the image data via the network, at least one child device connected to the parent device through a network including a second memory unit operationally connected to the first memory unit for storing the image data that has been transferred from the first memory unit via the network, a second image forming unit connected to the second memory unit for reading the transferred image data and forming an image on an image-transferring medium, a second control unit connected to the second memory unit and the second image forming unit for controlling the second memory unit and the second image forming unit, the image forming device network system comprising:

a first remaining memory detection unit connected to the first memory unit for detecting a remaining amount of memory in the first memory unit;

a collaboration unit connected to the parent device and the child device for activating a collaboration mode for a collaboration print job between the child device and the parent device;

a receiving unit located at the child device and connected to the parent device for receiving the image data that is transferred from the parent device to the child device; and an execution unit connected to said receiving unit for initiating the second image forming unit for the collaboration print job only after an entire portion of a predetermined size of the transferred image data for the collaboration print job is stored in the second memory unit.

2. The image forming device network system according to claim 1 further comprising a second remaining memory detection unit connected to the second memory unit for detecting a remaining amount of memory in the second memory unit.

3. The image forming device network system according to claim 2 wherein said second remaining memory detecting unit detects a predetermined remaining memory level in the second memory unit to generate a memory full signal, said second remaining memory detecting unit further comprising a reporting sub-unit for reporting the memory full signal to the parent device.

4. The image forming device network system according to claim 3 further comprising a transfer interrupt unit located at the parent device and connected to said second remaining memory detecting unit and said collaboration unit for interrupting the transfer of the image data to the child device via the network upon receiving the memory full signal.

5. The image forming device network system according to claim 4 wherein said collaboration unit cancels the collaboration print job after the image transfer has been interrupted from the parent device to the child device, said collaboration unit removing the transferred image data from the second memory unit.

6. The image forming device network system according to claim 5 wherein said collaboration unit deactivates the collaboration mode.

7. The image forming device network system according to claim 6 further comprising a reservation unit located at the parent device for reserving next ones of the collaboration print job while the collaboration print job is being executed.

8. The image forming device network system according to claim 7 wherein said reservation unit informs said collaboration unit of no reservation job to preserve the collaboration mode if no job has been reserved when said second remaining memory detecting unit detects the predetermined remaining memory level in the second memory unit.

9. The image forming device network system according to claim 7 wherein said reservation unit informs said collaboration unit of a reservation job to deactivate the collaboration mode if a job has been reserved when said second remaining memory detecting unit detects the predetermined remaining memory level in the second memory unit.

10. The image forming device network system according to claim 7 wherein said collaboration unit onsets the image data transfer from the parent device to the child device when the corresponding one of the reserved jobs becomes the activated collaboration print job.

11. The image forming device network system according to claim 10 wherein said collaboration unit prevents the image data transfer if the parent device completes the activated collaboration print job before the child device has a chance to perform the activated collaboration print job.

12. The image forming device network system according to claim 10 wherein said collaboration unit interrupts the image data transfer if the parent device initiates a last portion of the activated collaboration print job while the image data is being transferred from the parent device to the child devices, said collaboration unit removing the transferred image data from the second memory unit.

13. The image forming device network system according to claim 2 further comprising a memory comparison unit connected to said second remaining memory detection unit for comparing the remaining memory amount in the second memory unit and a size of the image data to generate a comparison result.

14. The image forming device network system according to claim 13 wherein said memory comparison unit further comprises a transfer determination sub-unit for determining an image data transfer of the image data based upon the comparison result.

15. The image forming device network system according to claim 14 wherein said transfer determination sub-unit interrupts the image data transfer if the remaining memory amount in the second memory unit is less than the image data size.

16. The image forming device network system according to claim 13 further comprising a display unit connected to said memory comparison unit for displaying information on the child device having the remaining memory amount in the second memory unit that is larger than the image data size.

17. The image forming device network system according to claim 1 wherein said collaboration unit removes the image data from the first memory unit when said collaboration unit determines that the collaboration print job between the child device and the parent device is completed.

18. The image forming device network system according to claim 1 further comprising a selection unit connected to said collaboration unit for a user to select the collaboration mode or a single operation mode for a print job.

19. The image forming device network system according to claim 1 wherein said collaboration unit further comprises an allocation unit for allocating an initial share of the collaboration print job at the child device and the parent device, wherein said collaboration unit monitors printing of the collaboration print job at the child device and the parent device to generate a print completion signal, said allocating unit further reallocating a remaining share of the collaboration print job at the child device and the parent device based upon the print completion signal.

20. The image forming device network system according to claim 1 further comprising a distribution unit connected to said collaboration unit for distributing the collaboration print job to a selected one of the child devices based upon availability and a current load amount.

21. The image forming device network system according to claim 20 further comprising a remaining resource monitoring unit connected to said distribution unit for monitoring a remaining resource at the parent device and each of the child devices.

22. The image forming device network system according to claim 21 wherein the remaining resource includes paper and toner.

23. The image forming device network system according to claim 21 wherein said distribution unit determines whether or not the parent device alone prints an entire portion of the collaboration print job based upon the remaining resource at the parent device.

24. The image forming device network system according to claim 23 wherein said distribution unit assigns a part of the collaboration print job to a selected one of the child devices based upon the remaining resource at the child devices if the remaining resource at the parent device is not sufficient for the collaboration print job.

25. The image forming device network system according to claim 24 further comprising a display unit located at the parent device connected to said distribution unit for displaying information on the selected child device.

26. The image forming device network system according to claim 24 further comprising a display unit located at the child device connected to said distribution unit for displaying information on the collaboration job.

27. The image forming device network system according to claim 1 further comprising an image consolidation unit connected to said collaboration unit for consolidating the image data in a predetermined manner to generate consolidated image data before transferring from the parent device to the child device.

28. The image forming device network system according to claim 27 further comprising a determination unit for determining whether a print mode is in a stack mode or a sort mode prior to generating the consolidated image data.

29. The image forming device network system according to claim 28 wherein said image consolidation unit at the parent device generates all of the consolidated image data and transfers the consolidated image data from a first portion in case of the sort mode.

30. The image forming device network system according to claim 28 wherein said image consolidation unit at the parent device generates all of the consolidated image data and transfers the consolidated image data from a last portion in case of the stack mode.

31. The image forming device network system according to claim 28 wherein the transferred image at the child device is removed as soon as the collaboration print job at the child device is complete.

32. The image forming device network system according to claim 1 wherein the parent device transfers the image data from a last portion and the child device prints the image data from the last portion in a stack mode during the collaboration mode.

33. The image forming device network system according to claim 32 wherein the parent device terminates the transfer of the image data if a corresponding image is already printed.

34. The image forming device network system according to claim 33 wherein if the parent device completes the transfer of the image data to the child device, the child device normally completes printing of the transferred image and the parent device also completes printing of the image data, the image data is removed from the first and second memory units.

35. An image forming device network system, comprising:
a parent device further comprising:
a first image scanning unit for scanning an image to generate image data;
a first memory unit connected to said first image scanning unit for storing the image data that has been scanned in by said image scanning unit;
a first remaining memory detection unit connected to said first memory unit for detecting a remaining amount of memory in said first memory unit;
a first image forming unit connected to said first memory unit for reading the image data and forming an image on an image-transferring medium; and
a first control unit connected to said first image scanning unit, said first memory unit and said first image forming unit for controlling said first image scanning unit, said first memory unit and said image forming unit, said first control unit controlling transfer of the image data via the network; and
at least one child device connected to said parent device through a network further comprising:
a second memory unit operationally connected to said first memory unit for storing the image data that has been transferred from said first memory unit via the network;
a second image forming unit connected to said second memory unit for reading the transferred image data and forming an image on an image-transferring medium; and
a second control unit connected to said second memory unit and said second image forming unit for controlling said second memory unit and said second image forming unit, wherein said first control unit and said second control unit performing a collaboration print job, said first control unit and said second control unit initiating a collaboration mode for the collaboration print job only after an entire portion of a predetermined size of the transferred image data for the collaboration print job is stored in said second memory unit.

36. The image forming device network system according to claim 35 further comprising a second remaining memory detection unit connected to said second memory unit for detecting a remaining amount of memory in said second memory unit.

37. The image forming device network system according to claim 36 wherein said second remaining memory detecting unit detects a predetermined remaining memory level in said second memory unit to generate a memory full signal, said second remaining memory detecting unit further comprises a reporting sub-unit for reporting the memory full signal to said parent device.

38. The image forming device network system according to claim 37 wherein said parent device stops the transfer of the image data to said child device via the network upon receiving the memory full signal.

39. The image forming device network system according to claim 38 wherein said first control unit and said second control unit cancel the collaboration print job after the image transfer has been interrupted from the parent device to the child device, said first control unit and said second control unit removing the transferred image data from the second memory unit.

40. The image forming device network system according to claim 39 wherein said second control unit deactivates the collaboration mode.

41. The image forming device network system according to claim 40 further comprising a reservation unit located at the parent device for reserving next ones of the collaboration print job while the collaboration print job is being executed.

42. The image forming device network system according to claim 41 wherein said reservation unit informs said first control unit and said second control unit of no reservation job to preserve the collaboration mode if no job has been reserved when said second remaining memory detecting unit detects a predetermined remaining memory level in the second memory unit.

43. The image forming device network system according to claim 42 wherein said reservation unit informs said first control unit and said second control unit of no reservation job to deactivate the collaboration mode if a job has been reserved when said second remaining memory detecting unit detects a predetermined remaining memory level in the second memory unit.

44. The image forming device network system according to claim 35 wherein said first control unit further comprises an allocation unit for allocating an initial share of the collaboration print job at the child device and the parent device, wherein said first control unit and said second control unit respectively monitor printing of the collaboration print job at the parent device and the child device to generate a print completion signal, said allocation unit further reallocating a remaining share of the collaboration print job at the child device and the parent device based upon the print completion signal.

* * * * *